United States Patent
Celo et al.

(10) Patent No.: US 11,480,844 B2
(45) Date of Patent: Oct. 25, 2022

(54) METHOD AND APPARATUS FOR CONTROL OF OPTICAL PHASE SHIFTERS IN AN OPTICAL DEVICE

(71) Applicant: Huawei Technologies Co., Ltd., Shenzhen (CN)

(72) Inventors: Dritan Celo, Ottawa (CA); Chunhui Zhang, Wuhan (CN); Dominic John Goodwill, Ottawa (CA); Eric Bernier, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 74 days.

(21) Appl. No.: 16/921,096

(22) Filed: Jul. 6, 2020

(65) Prior Publication Data

US 2020/0355980 A1    Nov. 12, 2020

Related U.S. Application Data

(63) Continuation of application No. PCT/CN2018/084324, filed on Apr. 25, 2018.

(51) Int. Cl.
*G02F 1/225* (2006.01)
*G02F 1/01* (2006.01)
*G02F 1/31* (2006.01)

(52) U.S. Cl.
CPC ............ *G02F 1/225* (2013.01); *G02F 1/0121* (2013.01); *G02F 1/31* (2013.01); *G02F 1/311* (2021.01)

(58) Field of Classification Search
CPC .......... G02F 1/225; G02F 1/0121; G02F 1/31; G02F 1/311
See application file for complete search history.

(56) References Cited

U.S. PATENT DOCUMENTS

| 4,390,849 A | * | 6/1983 | Miskin | .................. H03F 3/2171 330/10 |
| 4,672,687 A | * | 6/1987 | Horton | ..................... H01Q 3/24 333/103 |

(Continued)

FOREIGN PATENT DOCUMENTS

| CN | 102077136 A | 5/2011 |
| CN | 103066881 A | 4/2013 |

(Continued)

OTHER PUBLICATIONS

Wang et al., Silicon high-speed binary phase-shift keying modulator with a single-drive push-pull high-speed traveling wave electrode, Photon. Res. / vol. 3, No. 3 / Jun. 2015, Posted Feb. 13, 2015. (Year: 2015).*

(Continued)

*Primary Examiner* — Peter Radkowski
(74) *Attorney, Agent, or Firm* — Slater Matsil, LLP

(57) ABSTRACT

A method and apparatus is provided for control of plural optical phase shifters in an optical device, such as a Mach-Zehnder Interferometer switch. Drive signal magnitude is set using a level setting input and is used for operating both phase shifters, which may have similar characteristics due to co-location and co-manufacture. A device state control signal selects which of the phase shifters receives the drive signal. One or more switches may be used to route the drive signal to the selected phase shifter. Separate level control circuits and state control circuits operating at different speeds may be employed. When the phase shifters are asymmetrically conducting (e.g. carrier injection) phase shifters, a bi-polar drive circuit can be employed. In this case, the phase shifters can be connected in reverse-parallel, and the drive signal polarity can be switchably reversed in order to drive a selected one of the phase shifters.

20 Claims, 13 Drawing Sheets

(56) References Cited

U.S. PATENT DOCUMENTS

| | | | | |
|---|---|---|---|---|
| 5,014,016 | A * | 5/1991 | Anderson | H03F 3/2171 330/10 |
| 6,127,885 | A * | 10/2000 | Colangelo | H03F 3/217 330/10 |
| 6,721,081 | B1 * | 4/2004 | Mauro | G02F 1/0123 359/239 |
| 6,763,197 | B1 * | 7/2004 | Hirano | H04J 14/08 398/191 |
| 7,460,612 | B2 * | 12/2008 | Eliezer | H03C 3/40 332/103 |
| 7,576,674 | B2 * | 8/2009 | Tsuchi | G09G 3/3685 341/138 |
| 7,994,956 | B2 * | 8/2011 | Tsuchi | G09G 3/3696 341/144 |
| 8,705,900 | B2 * | 4/2014 | Goh | G02F 1/0121 385/3 |
| 8,831,544 | B2 * | 9/2014 | Walker | H03F 3/245 455/127.1 |
| 8,953,950 | B2 * | 2/2015 | Nazarathy | H03M 1/46 398/203 |
| 8,963,615 | B1 * | 2/2015 | Abawi | H03K 17/16 327/415 |
| 9,104,085 | B2 | 8/2015 | Wesstrom | |
| 9,350,450 | B2 * | 5/2016 | Chen | H04B 10/516 |
| 9,570,879 | B2 * | 2/2017 | Hara | H01S 3/0057 |
| 9,608,723 | B2 * | 3/2017 | Chen | H04B 10/0799 |
| 9,621,391 | B2 * | 4/2017 | Chen | H04L 25/03343 |
| 10,079,988 | B2 * | 9/2018 | Yanagida | H04N 5/378 |
| 10,440,302 | B2 * | 10/2019 | Yanagida | H04N 5/3532 |
| 2002/0163458 | A1 * | 11/2002 | Jin | H03F 3/3069 341/152 |
| 2004/0061922 | A1 * | 4/2004 | Mauro | H04B 10/25137 359/279 |
| 2004/0263244 | A1 * | 12/2004 | Masuda | H03F 3/217 330/10 |
| 2006/0291589 | A1 * | 12/2006 | Eliezer | H03C 3/40 375/302 |
| 2008/0211703 | A1 * | 9/2008 | Tsuchi | H03M 1/682 341/144 |
| 2009/0273618 | A1 * | 11/2009 | Tsuchi | G09G 3/3696 345/690 |
| 2009/0324253 | A1 | 12/2009 | Winzer | |
| 2012/0044022 | A1 * | 2/2012 | Walker | H03F 3/245 330/296 |
| 2012/0213531 | A1 * | 8/2012 | Nazarathy | H03M 3/434 398/202 |
| 2013/0011093 | A1 * | 1/2013 | Goh | H04B 10/5051 385/3 |
| 2013/0322809 | A1 | 12/2013 | Goh et al. | |
| 2015/0029575 | A1 * | 1/2015 | Hara | G01N 21/3581 359/279 |
| 2015/0086215 | A1 * | 3/2015 | Chen | H04B 10/2575 398/136 |
| 2016/0112123 | A1 * | 4/2016 | Chen | H04J 14/0227 398/38 |
| 2016/0212003 | A1 * | 7/2016 | Chen | H04B 10/6971 |
| 2016/0373076 | A1 * | 12/2016 | Buono | H03F 3/183 |
| 2017/0013221 | A1 * | 1/2017 | Yanagida | H04N 5/3532 |
| 2017/0052394 | A1 | 2/2017 | Goodwill | |
| 2018/0359439 | A1 * | 12/2018 | Yanagida | H04N 5/3532 |

FOREIGN PATENT DOCUMENTS

| | | |
|---|---|---|
| CN | 103384849 A | 11/2013 |
| CN | 103856034 A | 6/2014 |
| CN | 107924074 A | 4/2018 |

OTHER PUBLICATIONS

Le Nguyen Binh, "Variable pulse width alternating phase duobinary modulation optical transmission," Proc. SPIE 6353, Optical Transmission, Switching, and Subsystems IV, 635326 (Oct. 3, 2006); doi: 10.1117/12.685316 (Year: 2006).*

Le Nguyen Binh, Optical transmission of variable-pulse-width alternating-phase duobinary modulation: MATLAB Simulink simulation and comparison with carrier-suppressed return-to-zero amplitude-shift-keying experimental transmission, Optical Engineering 47_7_, 075001 _Jul. 2008 (Year: 2008).*

Zecevic et al., Integrated Pulsewidth Modulation Control fora Scalable Optical Switch Matrix, IEEE Photonics Journal, vol. 7, No. 6, Dec. 2015 (Year: 2915).*

Akiyama et al., High-speedandefficientsiliconmodulatorbasedonforward-biasedpindiodes, frontiers in Physics, Nov. 2014, vol. 2, Article 65 (Year: 2014).*

Dong et al., Submilliwatt, ultrafast and broadband electro-optic silicon switches, Nov. 2010 /vol. 18, No. 24 / OPTICS Express 25225 (Year: 2010).*

David Patel, Design, Analysis, and Performance of a Silicon Photonic Traveling Wave Mach-Zehnder Modulator, Thesis, Department of Electrical & Computer Engineering, McGill University, 2014 (Year: 2014).*

Shoji et al., Low-crosstalk 2 × 2 thermo-opticswitch with silicon wire waveguides, Apr. 26, 2010 / vol. 18, No. 9/ OPTICS Express 9071 (Year: 2010).*

Ribeiro et al., Digitally controlled multiplexed silicon photonics phase shifter using heaters with integrated diodes, Optics Express, V . 25, N. 24, Nov. 27, 2017 (Year: 2017).*

Ribeiro et al., Thermo-optical phase shifter with integrated diodes for multiplexed control, in Optical Fiber Communication Conference, OSA Technical Digest (online) (Optical Society of America, 11 March - Mar. 15, 2018), paper Th2A.4 (Year: 2018).*

Sacher et al., Coupling-modulated microrings for DPSK modulation, CLEO:2013 Technical Digest, CTu2F.3.pdf CTu2F.3.pdf (Year: 2013).*

Yunchu Li, Lawrence S. Stewart, and P. Daniel Dapkus, "High speed silicon microring modulator employing dynamic intracavity energy balance," Opt. Express 20, 7404-7414 (2012) (Year: 2012).*

Y. Li and P. D. Dapkus, "Silicon-Microring-Based Modulation of 120 Gbps DPSK Signal," in CLEO: 2013, OSA Technical Digest (online) (Optica Publishing Group, 2013), paper JTu4A.45. (Year: 2013).*

Li, Yunchu, Silicon Micro-ring Resonator Device Design for Optical Interconnect Systems, University of Southern CaliforniaProQuest Dissertations Publishing, Degree Year2013. 3563933. (Year: 2013).*

* cited by examiner

METHOD AND APPARATUS FOR CONTROL OF OPTICAL PHASE SHIFTERS IN AN OPTICAL DEVICE

CROSS-REFERENCE TO RELATED APPLICATIONS

This application is a continuation of PCT Application No. PCT/CN2018/084324, filed on Apr. 25, 2018, which application is hereby incorporated herein by reference.

TECHNICAL FIELD

The present disclosure pertains to the field of optical devices such as optical switches and in particular to control of multiple optical phase shifters of such a device, the optical phase shifters for example being in a push-pull configuration.

BACKGROUND

To meet continued growth in data network traffic demands, new data switching technologies with large switching capacities and high interconnect bandwidths are required. Optical switching systems represent one such technology. Silicon-on-insulator (SOI) technologies provide a low-cost platform for high-performance optical switching technologies for data center communication applications. For such applications, switches that are high-speed, broadband, low crosstalk, and have low-power consumptions are desired.

On an SOI platform, optical devices (such as but not necessarily limited to devices including Mach-Zehnder interferometers (MZI)) that have carrier injection phase shifters operating in a push-pull configuration are commonly used for high-speed switches and other applications. While providing an efficient optical phase shift with speeds up to potentially hundreds of megahertz, carrier injection also produces inherent insertion loss due to free-carrier absorption. Further, due to fabrication imperfections and non-uniformities, there is phase error and power imbalance between waveguide arms of the MZI, resulting in some light leakage at the unwanted output port, which in turn causes insertion loss, optical crosstalk, and reduced extinction ratio.

Therefore, there is a need for an optical device such as an optical switch, and method and apparatus for controlling same, that obviates or mitigates one or more limitations of the prior art.

This background information is provided to reveal information believed by the applicant to be of possible relevance to the present disclosure. No admission is necessarily intended, nor should be construed, that any of the preceding information constitutes prior art against the present disclosure.

SUMMARY

In accordance with embodiments of the disclosure, there is provided a method and apparatus for control (e.g. push-pull control) of plural optical phase shifters in an optical device. In accordance with embodiments of the present disclosure, there is provided an apparatus for controlling a pair of phase shifters of an optical device, such as but not necessarily limited to an optical switching cell. The apparatus includes a drive circuit having a first input terminal, a second input terminal, and operating circuitry. The circuitry is configured to generate a drive signal having a magnitude which is set based on a level setting input signal received at the first input terminal. The circuitry generates the drive signal for driving the pair of phase shifters of the optical device, rather than for driving phase shifters for plural optical devices. The circuitry is configured to drive one of the pair of phase shifters using the drive signal, where this one of the pair of phase shifters being selected based on a device state control signal received at the second input terminal.

The drive circuit may include a Digital-to-Analog Converter (DAC) (e.g. one channel of a multi-channel DAC) configured to control the magnitude of the drive signal based on a digital input. In various embodiments, the pair of phase shifters have substantially the same operating characteristics due to co-manufacture and proximity to each other, and thus the same magnitude of drive signal is appropriate for driving both phase shifters.

In various embodiments, the drive circuit includes a level control circuit for controlling magnitude of the drive signal, and a separate state control circuit for controlling which one of the pair of phase shifters is predominantly driven at a time. The level control circuit and state control circuits can vary their outputs at different speeds.

In various embodiments, the drive circuit is a bi-polar drive circuit configured to control a polarity of the drive signal based on the device state control signal and provide the drive signal via an output terminal of the bi-polar drive circuit. In such embodiments, the phase shifters are asymmetrically conducting (e.g. carrier injection phase shifters), and the apparatus further includes a phase shifter circuit comprising the pair of phase shifters connected together in reverse-parallel and driven by the drive signal via the output terminal of the bi-polar drive circuit.

In various embodiments, the drive circuit includes a switching circuit configured to operatively couple the drive signal to a selectable one of the pair of phase shifters based on the device state control signal.

In accordance with embodiments of the present disclosure, there is provided an optical device comprising the above-described apparatus. The optical device may be, for example, a Mach-Zehnder Interferometer (MZI) device, a MZI based optical switching cell, a Micro Ring Resonator (MRR), a MZI device comprising a MRR, a plurality of MRRs in series or parallel, an optical switch, an optical attenuator, a variable optical attenuator, a modulator, or a pilot tone modulator.

In accordance with embodiments of the present disclosure, there is provided a method for controlling a pair of phase shifters of an optical device. The method includes receiving a level setting input signal specific to the pair of phase shifters. The method further includes setting magnitude of a drive current based on the level setting input signal, the magnitude of the drive current being set specifically for the pair of phase shifters. The method further includes monitoring a device state control signal having a first state and a second state. The method further includes causing the drive current to flow through only a first one of the pair of phase shifters when the device state control signal is in the first state and to flow through only a second one of the pair of phase shifters when the device state control signal is in the second state.

In embodiments where the pair of phase shifters are connected together in reverse-parallel to an output of the drive circuit, causing the drive current to flow through only the first one of the pair of phase shifters includes causing the drive current to flow in a first direction, and causing the drive current to flow through only the second one of the pair of phase shifters comprises causing the drive current to flow in opposition to the first direction.

In some embodiments, causing the drive current to flow through only the first one of the pair of phase shifters includes operatively coupling the drive circuit to the first one of the pair of phase shifters using a switch, and causing the drive current to flow through only the second one of the pair of phase shifters includes operatively coupling the drive circuit to the second one of the pair of phase shifters using said switch.

BRIEF DESCRIPTION OF THE DRAWINGS

Further features and advantages of the present disclosure will become apparent from the following detailed description, taken in combination with the appended drawings, in which:

FIG. 2 illustrates, in a block diagram, an example configuration of a bi-polar drive circuit for controlling an MZI-based push-pull CIOS cell in electrical domain according to an embodiment of the present disclosure.

It will be noted that throughout the appended drawings, like features are identified by like reference numerals.

DETAILED DESCRIPTION OF ILLUSTRATIVE EMBODIMENTS

Figure 1A:
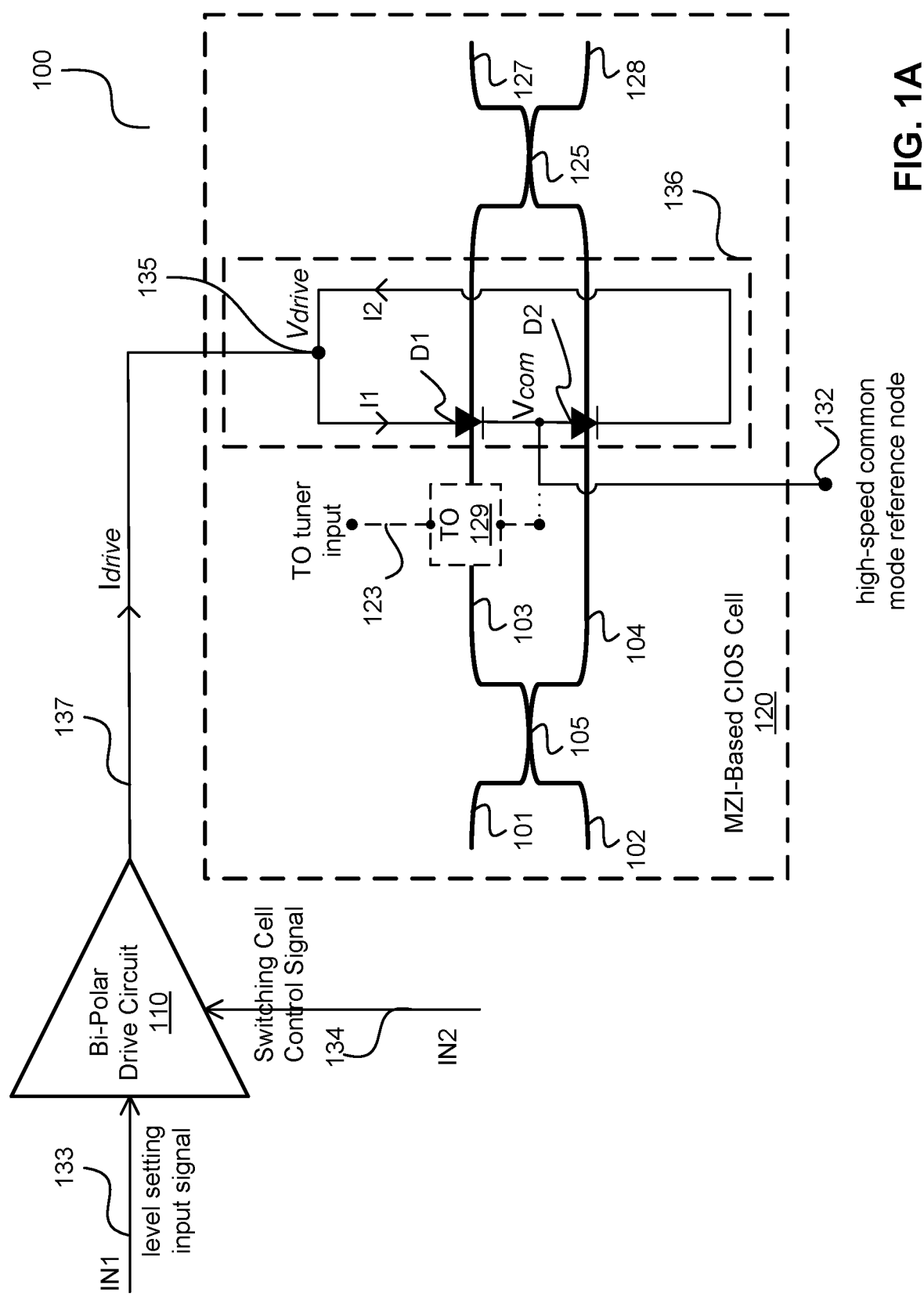
FIG. 1A illustrates an example push-pull configuration of a Mach-Zehnder Interferometer (MZI) based Carrier Injection Optical Switch (CIOS) cell and an associated drive circuit according to an embodiment of the present disclosure.

Embodiments of the present disclosure provide a method of and an apparatus for controlling optical devices that have plural phase shifters, for example operating in a push-pull configuration. These optical devices may include but are not limited to a Mach-Zehnder Interferometer (MZI) device, an MZI based optical switching cell, a Micro Ring Resonator (MRR), an MZI device comprising an MRR, a plurality of MRRs in series or parallel, an optical switch, an optical attenuator, a variable optical attenuator, a modulator, or a pilot tone modulator, where a push-pull driver is required. For clarity, the example of application to an optical switch is considered in detail. In various embodiments, only one of the plural phase shifters is activated (e.g. forward biased) at a time. A push-pull configuration can refer to a configuration in which plural phase shifters are integrated into different parts of the optical device (e.g. different parallel arms of an MZI device) and operated in a complementary manner.

Embodiments of the present disclosure provide for an apparatus to independently adjust drive signal magnitude for each separate optical device (e.g. switching cell), while also allowing for switching between push and pull phase shifter states using a switch which is separate from the drive signal magnitude adjustment circuit. Because drive signal magnitude is performed on a per-device basis, crosstalk can be potentially reduced and contrast ratio can be potentially increased. Because the drive signal magnitude adjustment circuit is used for a pair of phase shifters rather than for a single phase shifter, the circuitry is simplified.

In some embodiments, a bi-polar drive circuit is used to control a polarity of a drive signal based on a device state control signal. The drive signal is then provided via an output terminal of the bi-polar drive circuit. Furthermore, the phase shifters are provided as asymmetrically conducting phase shifters. Such phase shifters allow (and are responsive to) current flow in substantially one direction only, and are represented in the electrical domain using a diode symbol. A primary example of an asymmetrically conducting phase shifter is a carrier injection phase shifter. A phase shifter configured as a Metal Oxide Semiconductor (MOS) device may also be an asymmetrically conducting phase shifter. Alternatively, a phase shifter connected in series with a diode or other asymmetrically conducting electrical component may be used as an asymmetrically conducting phase shifter. In such embodiments, the apparatus includes a phase shifter circuit having the pair of asymmetrical phase shifters connected together in reverse-parallel and driven by the drive signal via the output terminal of the bi-polar drive circuit. In other embodiments, a uni-polar drive circuit is used to selectably apply the drive signal to primarily one phase shifter at a time.

Reverse-parallel connection, also referred to as connection in parallel in opposite polarities, is a connection in which the anode of a first phase shifter and the cathode of a second phase shifter are coupled together to one node of the phase shifter circuit, and the cathode of the first phase shifter and the anode of the second phase shifter are coupled together to another node of the phase shifter circuit. The term "anode" and "cathode" are intended to capture the characteristics of two terminals of an asymmetrically conducing device such as a diode or carrier injection phase shifter, in which current is primarily allowed to flow, by convention and in forward biasing, from anode to cathode. Other types of phase shifters that may be employed include Carrier depletion junction phase shifters, Stark Effect phase shifters, and Franz Keldysh phase shifters, for example.

Embodiments of the present disclosure will be explained in more detail with respect to the accompanying drawings.

FIG. 1A illustrates an example push-pull configuration of a Mach-Zehnder Interferometer (MZI)-based Carrier Injection Optical Switch (CIOS) cell 120 and an associated drive circuit according to at least one embodiment of the present disclosure. The cell 120 may be one of a potentially large number of similar cells which are interconnected in a switching fabric, for example, with each cell associated with its own driving circuit.

As illustrated in FIG. 1A, the MZI-based CIOS cell 120 may include a first optical coupler 105 that receives and couples optical signals from a pair of input ports 101 and 102, and a second optical coupler 125 that couples signals provided at its inputs and provides optical signals at a pair of output ports 127 and 128. The couplers 105 and 125 may be 50% directional couplers, multimode interferometers (MMIs), or the like. Additionally, the MZI-based CIOS cell 120 may include a first optical waveguide arm 103 and a second optical waveguide arm 104 coupled in parallel between the first coupler 105 and the second coupler 125. Design and operation of the MZI-based CIOS cell 120, apart from design and operation of the associated drive circuit, will be readily understood by a worker skilled in the art.

In some embodiments, as illustrated in FIG. 1A, an apparatus 100 for controlling the MZI-based CIOS cell 120 operating in a push-pull configuration may include a bi-polar drive circuit 110 and a phase shifter circuit 136.

The bi-polar drive circuit 110 may include a first input terminal 133 configured to receive a level setting input signal, a second input terminal 134 configured to receive a device state control signal having a first state and a second state, and an output terminal 137 electrically coupled to the phase shifter circuit 136 to provide a drive signal. This drive signal may be a current or a voltage signal that causes a drive current to flow through the phase shifter circuit 136. The bi-polar drive circuit 110 may be configured to control a magnitude of the drive signal based on the level setting input signal and to control a polarity of the drive signal based on the device state control signal.

In the example embodiment as illustrate in FIG. 1A, the phase shifter circuit 136 may include a first carrier injection phase shifter D1 integrated with the first waveguide arm 103 and a second carrier injection phase shifter D2 integrated with the second waveguide arm 104 of the MZI-based CIOS cell 120. The carrier injection phase shifters are represented as diodes in the electrical domain (i.e. in the equivalent electrical circuit) for purposes of clarity, and to reflect their typical behavior in the electrical domain as asymmetrically conducting devices. However it should be understood that these phase shifters are devices which impart an optical phase shift to the respective optical arms of the MZI-based CIOS cell 120 based on carrier injection effects. The first carrier injection phase shifter D1 and the second carrier injection phase shifter D2 may be connected in parallel in opposite polarities with a first common node 135 electrically coupled to the output terminal 137 of the bi-polar drive circuit 110 and with a second common node electrically coupled to a high-speed common mode reference node 132. The pair of carrier injection phase shifters D1 and D2 may be, for example, p-i-n or p-n type phase shifters. The pair of phase shifters D1 and D2 may have substantially the same operating characteristics due to co-manufacture and proximity to each other. The pair of carrier injection phase shifters D1 and D2 may be operated in a push-pull manner, such that only one of the phase shifters is forward-biased at a time. Which one of the phase shifters is forward-biased is determined based on whether the device state control signal is in the first state or the second state. Typical switching time of the carrier injection phase shifters is on the order of a few nanoseconds, which may require very fast switching of current direction into phase shifter junction diodes.

Note that, by way of example, in this instant application, the first state of the device state control signal may refer to a "Cross" or "OFF" state, and the second state of the device state control signal may refer to a "Bar" or "ON" state.

Additionally, in some embodiments, a bias element 129 may be operatively coupled to (e.g. integrated with) one of the waveguide arms 103 and 104 (in this example embodiment, the first waveguide arm 103). The bias element 129 imparts an additional phase shift to optical signals traversing the first waveguide arm 103, for example due to a thermo-optic (TO) effect or another effect. This additional phase shift can be configured, for example based on a calibration operation, to impart a desired amount of phase shift for supporting the desired operation of the MZI-based CIOS switching cell 120. The bias element 129 may be configured to compensate for inequality of length of the waveguide arms 103 and 104, for example. An optical signal propagating through the first waveguide arm 103 may be delayed by the bias element 129 to match the delay in the second waveguide arm 104. Thus, the bias element 129 may be a thermal-optic (TO) phase shifter. By adjusting a tuner input 123 of the bias element 129, the desired phase shift imparted by the bias element can be controlled. For example, such adjustment may be performed to balance phase shift in the pair of waveguide arms 103 and 104. It is noted that the bias element 129 can alternatively be located between the first coupler 105 and the first carrier injection phase shifter D1.

As illustrated by the example embodiment in FIG. 1A, an optical signal entering the first input port 101 is split by the input coupler 105 into two signals of substantially equal magnitude propagating in the first waveguide arm 103 and second waveguide arm 104. With the TO phase shifter 129 having a phase shift of $-\pi/2$, when the drive current is applied to the first carrier injection phase shifter D1, the optical signal portion propagating in the first waveguide arm 103 may be delayed in phase by $\pi/2$, which results in the optical signal exiting the second output port 128. This is known as an "OFF" or "Cross" state; when the drive current is applied to the second carrier injection phase shifter D2, the optical signal portion propagating in the second waveguide arm 104 will be delayed in phase by $\pi/2$, which results in the optical signal exiting the first output port 127. This is known as the "ON" or "Bar" state. When the drive signal is a drive current, the drive current may be obtained by applying the current directly to (or drawing the current directly from) the common node 135 and the polarity of the drive current determines which one of the carrier injection phase shifters D1 and D2 is forward biased and therefore applying a corresponding amount of optical phase shift. Alternatively, when the drive signal is a voltage signal, the drive current may be obtained by applying a drive voltage to the common node 135. For example, if a voltage level at the common node 135 is higher than a voltage level at the high speed common mode reference node 132, the drive current may flow from the common node 135, through the carrier injection phase shifter D1 (which is forward biased), and toward the high speed common mode reference node 132. At the same time, the phase shifter D2 is reverse biased and thus conducts little to no current. The reverse-biased phase shifter may impart a limited, but possibly non-zero phase shift. If the voltage level at the common node 135 is lower than the voltage level at the high speed common mode reference node 132, the drive current may flow from the high speed common mode reference node 132, through the carrier injection phase shifter D2 (which is now forward biased), and toward the common node 135. At the same time, the phase shifter D1 is now reverse biased and thus conducts little to no current.

Figures 1, 1B:
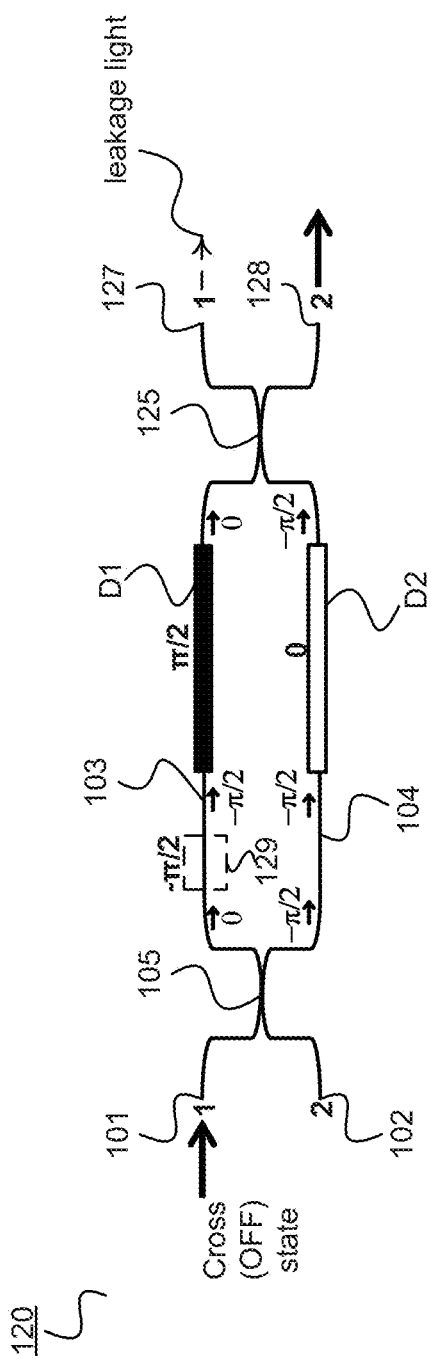
FIGS. 1B-1 and 1B-2 illustrate optical operation of the MZI based CIOS cell of FIG. 1A in "Cross" and "Bar" states, according to an embodiment of the present disclosure.
Figures 1, 1B, 2:
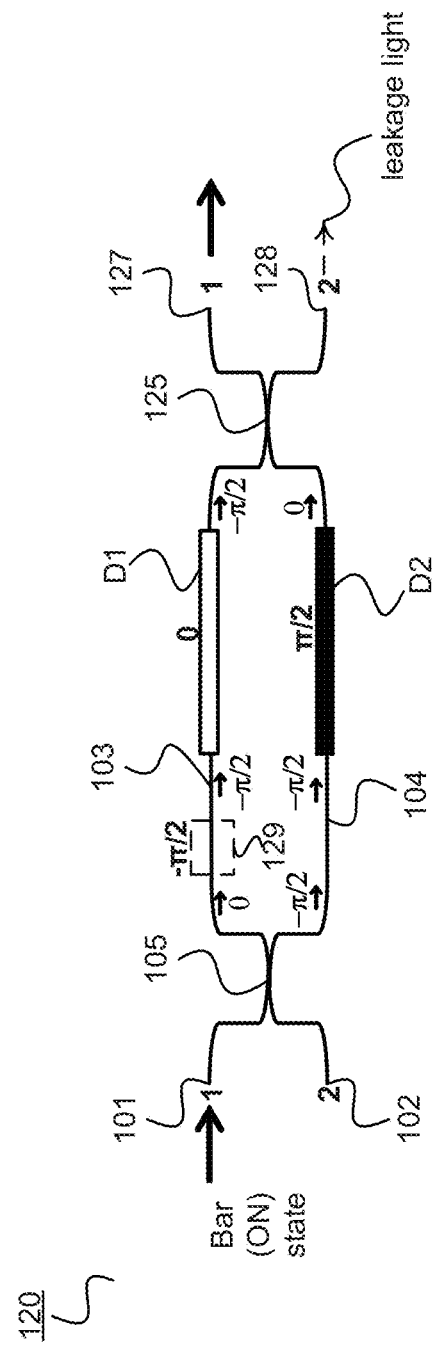

FIGS. 1B-1 and 1B-2 illustrate an example optical operation of an MZI-based CIOS cell, for purposes of clarity. The bias element TO 129 is configured to apply a phase shift of $-\pi/2$ radians to optical signals propagating through the waveguide arm 103. The couplers 105 and 125 each have upper inputs and outputs and lower inputs and outputs, and are configured such that part (e.g. 50%) of a signal applied to the upper (or lower input) is provided without phase shift at the upper (or lower) output, and the remainder of the signal applied to the upper (or lower input) is provided with a phase shift of $-\pi/2$ radians at the lower (or upper) output.

In FIG. 1B-1, the phase shifter D1, which may be a PIN type carrier injection phase shifter, is forward-biased and driven, for example using the bi-polar drive circuit 110, by a configured amount of current (or voltage, or both), such that it applies a phase shift of $\pi/2$ radians to optical signals propagating through the waveguide arm 103. At the same time, the phase shifter D2, which may also be a PIN type carrier injection phase shifter, is reverse-biased and substantially undriven, for example using the bi-polar drive circuit 110, such that it applies a phase shift of 0 radians to optical signals propagating through the waveguide arm 104. Taken together with operation of the bias element TO 129 and the couplers 105 and 125, this results in a signal applied to the upper (or lower) input of the coupler 105 being routed to the lower (or upper) output of the coupler 125, resulting in the "Cross" state of the optical switch.

In FIG. 1B-2, the phase shifter D2 is forward-biased and driven, for example using the bi-polar drive circuit 110, by a configured amount of current (or voltage, or both), such that it applies a phase shift of $\pi/2$ radians to optical signals propagating through the waveguide arm 104. At the same time, the phase shifter D1 is reverse-biased and substantially undriven, for example using the bi-polar drive circuit 110, such that it applies a phase shift of 0 radians to optical signals propagating through the waveguide arm 103. Taken together with operation of the bias element TO 129 and the couplers 105 and 125, this results in a signal applied to the upper (or lower) input of the coupler 105 being routed to the upper (or lower) output of the coupler 125, resulting in the "Bar" state of the optical switch.

Whereas the embodiments have been described with respect to the Cross and Bar states with an input signal illuminating a first optical input, the device may equally be configured and operated by illuminating a second optical input so that to respective states are Bar and Cross states.

Figure 1C:
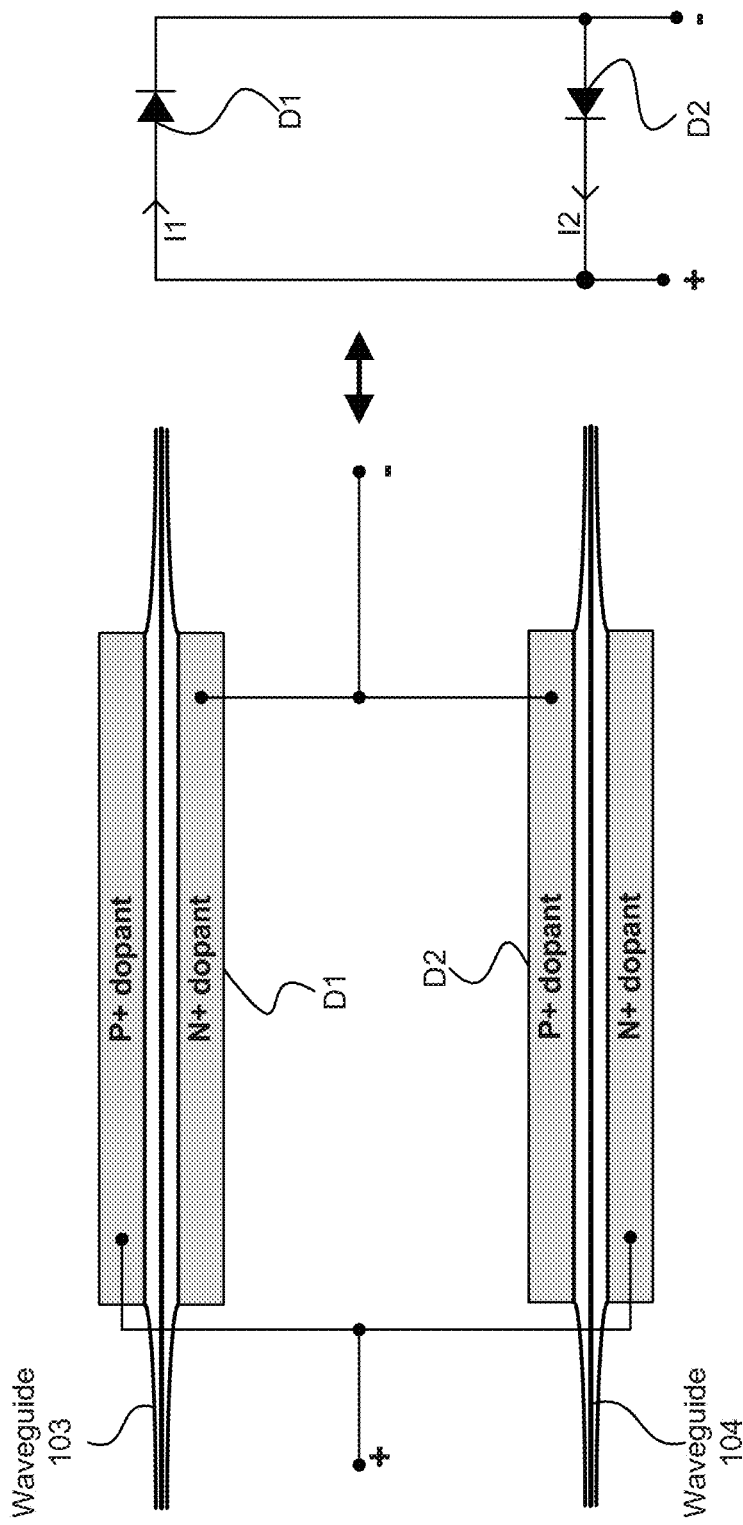
FIG. 1C illustrates an implementation of a pair of carrier injection phase shifters operatively coupled to a pair of waveguides and connected in a reverse-parallel configuration, according to an embodiment of the present disclosure.
Figure 2:
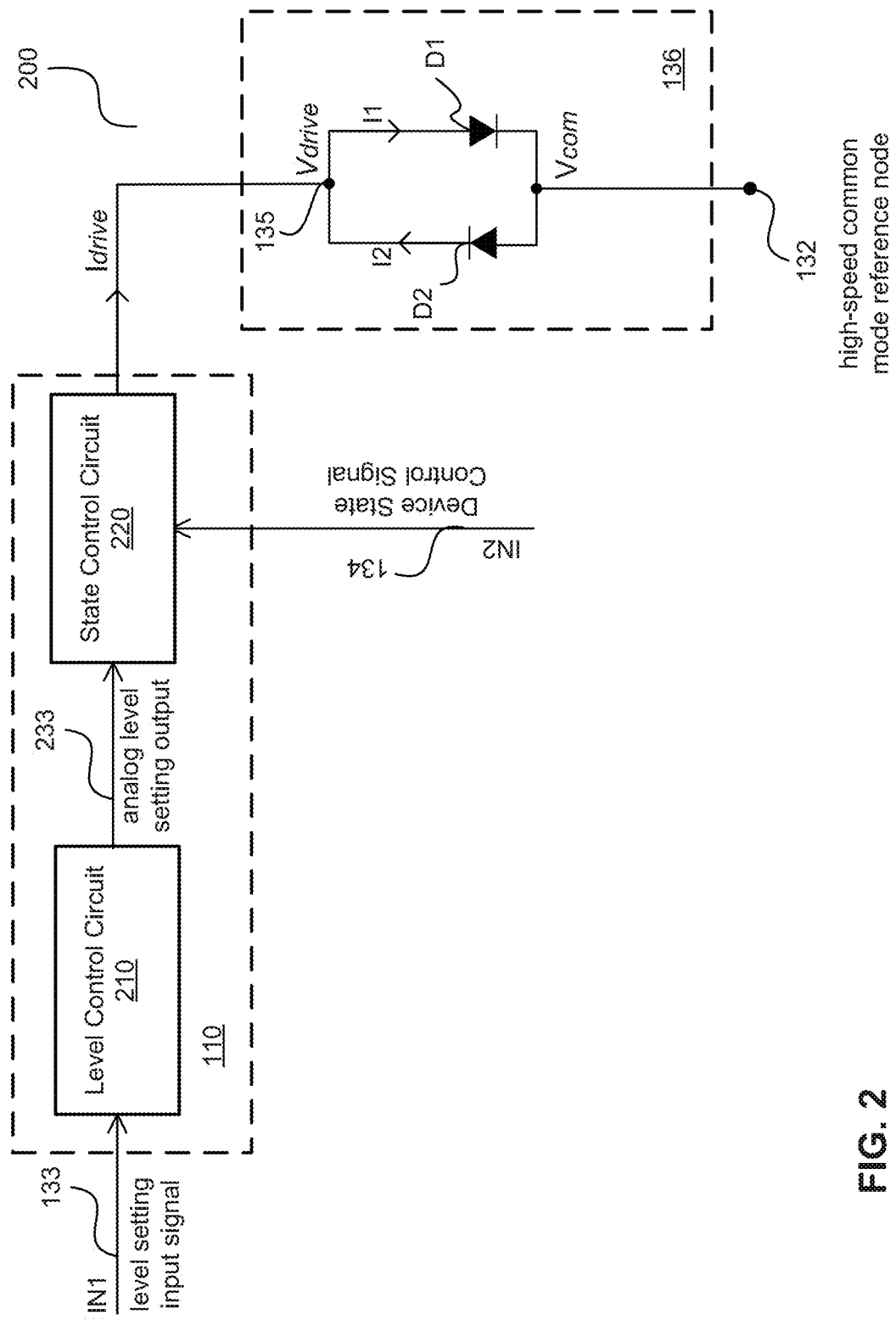

FIG. 1C schematically illustrates a pair of carrier injection phase shifters D1 and D2 integrated with a pair of waveguide arms 103, 104 and connected in reverse-parallel, according to an embodiment of the present disclosure. The equivalent electrical circuit is also shown. Each phase shifter includes a P-doped region and an N-doped region disposed on opposing sides of the waveguide to which it is coupled. The P-doped region of phase shifter D1 is electrically connected to the N-doped region of phase shifter D2, and the N-doped region of phase shifter D1 is electrically connected to the P-doped region of phase shifter D2.

Figure 3A:
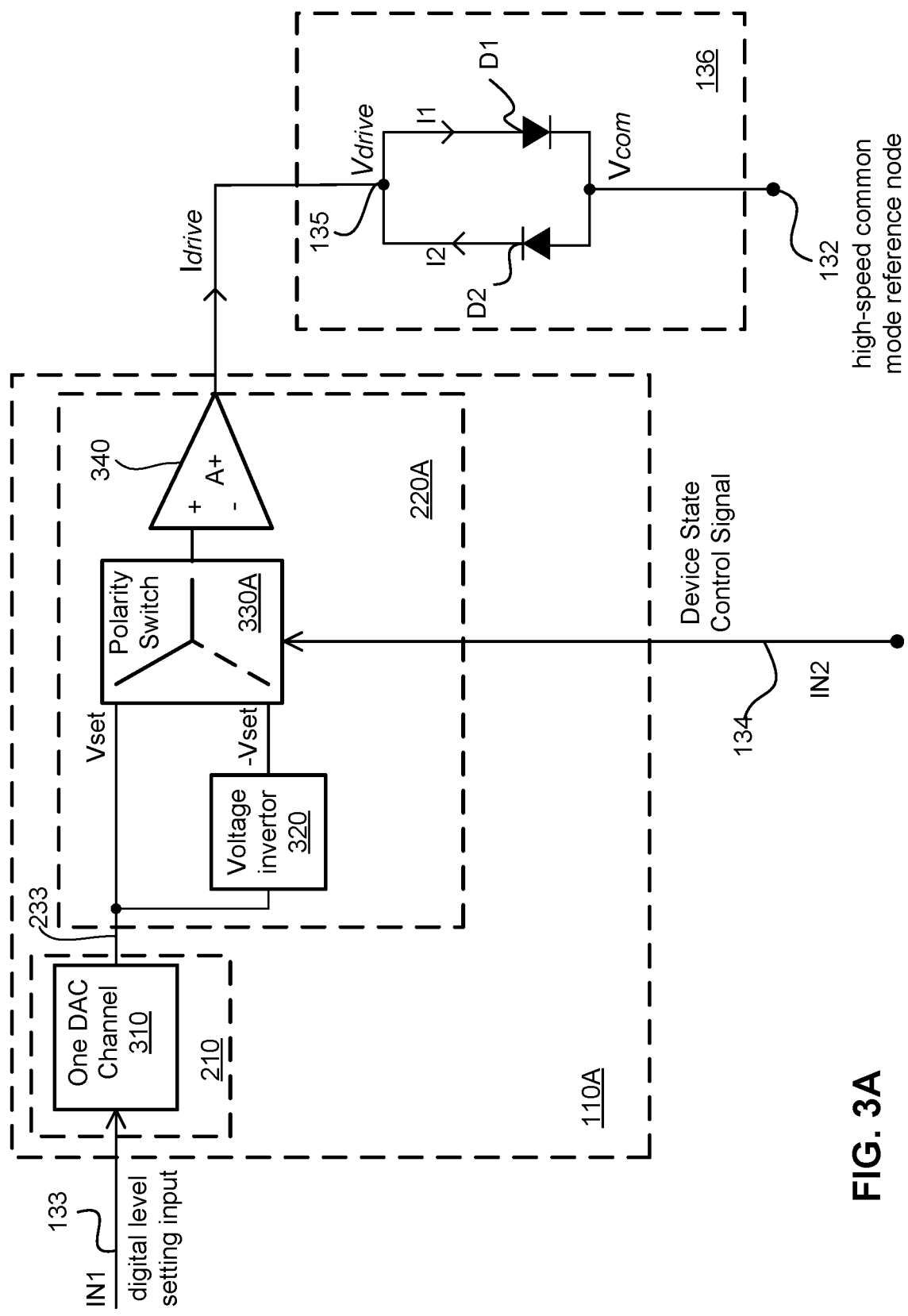
FIG. 3A illustrates, in a component view, an example implementation of a bi-polar drive circuit for controlling an MZI-based push-pull CIOS cell in electrical domain according to an embodiment of the present disclosure.
Figure 3B:
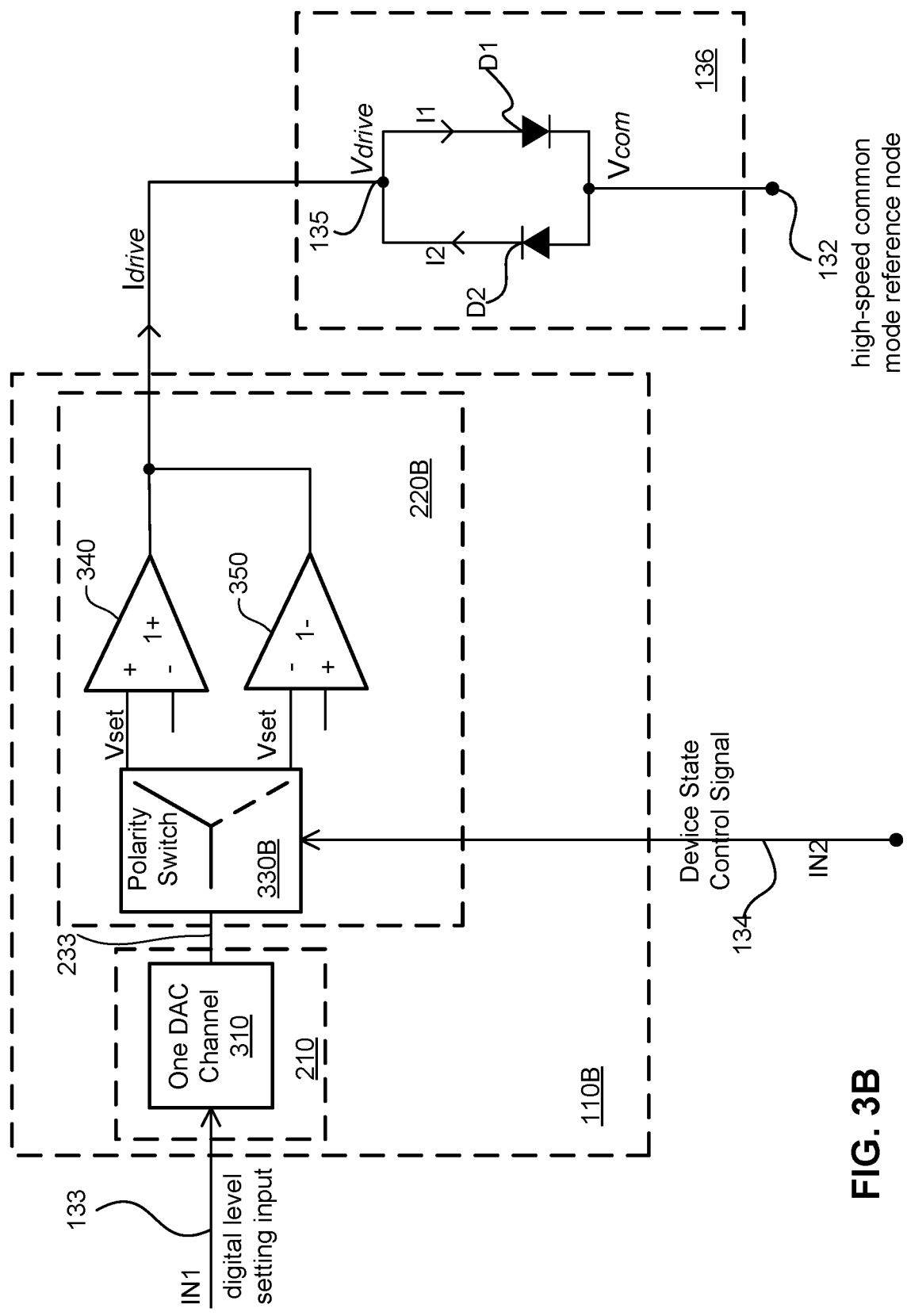
FIG. 3B illustrates, in a component view, an example implementation of a bi-polar drive circuit for controlling an MZI-based push-pull CIOS cell in electrical domain according to another embodiment of the present disclosure.
Figure 3C:
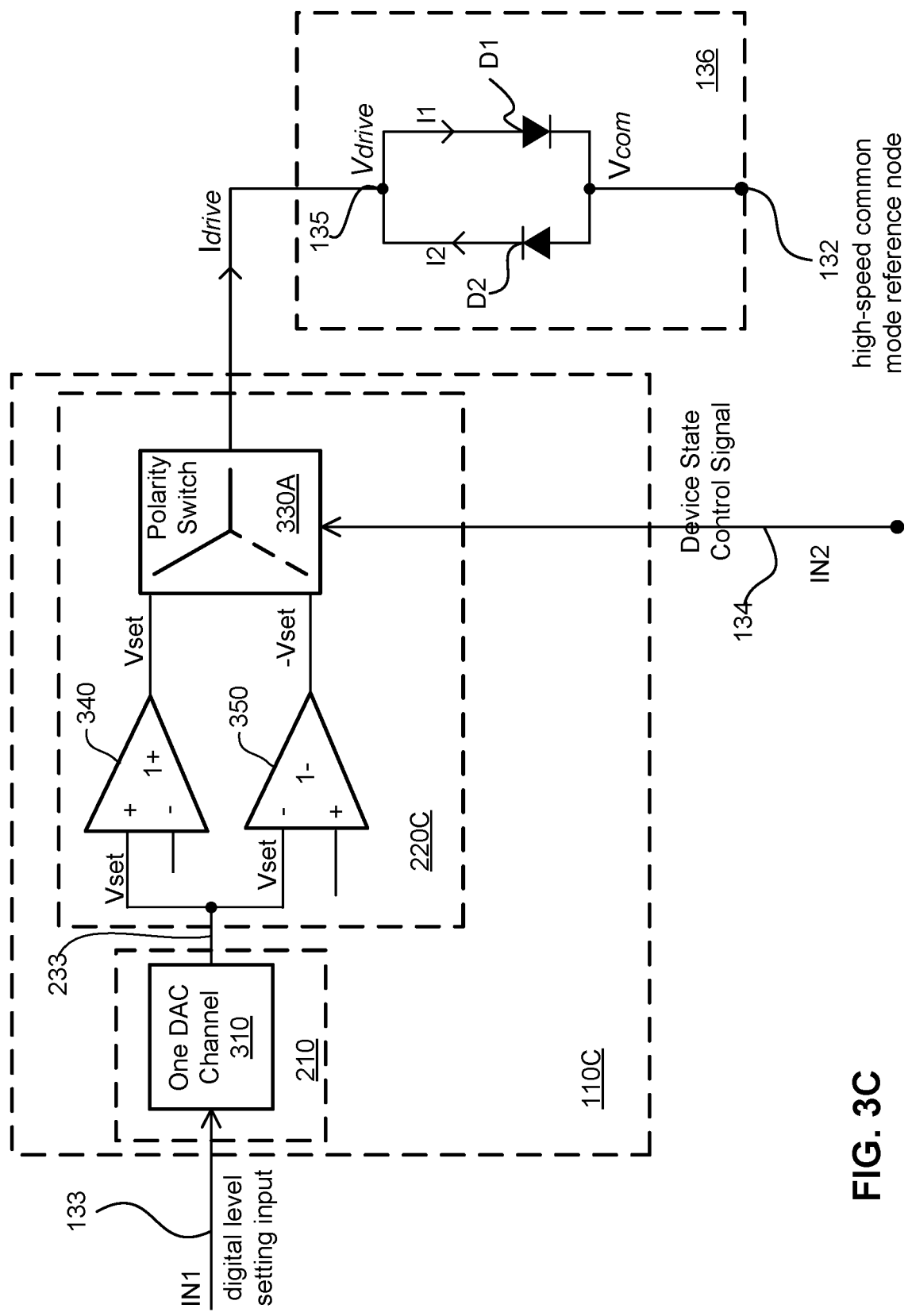
FIG. 3C illustrates, in a component view, an example implementation of a bi-polar drive circuit for controlling an MZI-based push-pull CIOS cell in electrical domain according to another embodiment of the present disclosure.
Figure 3D:
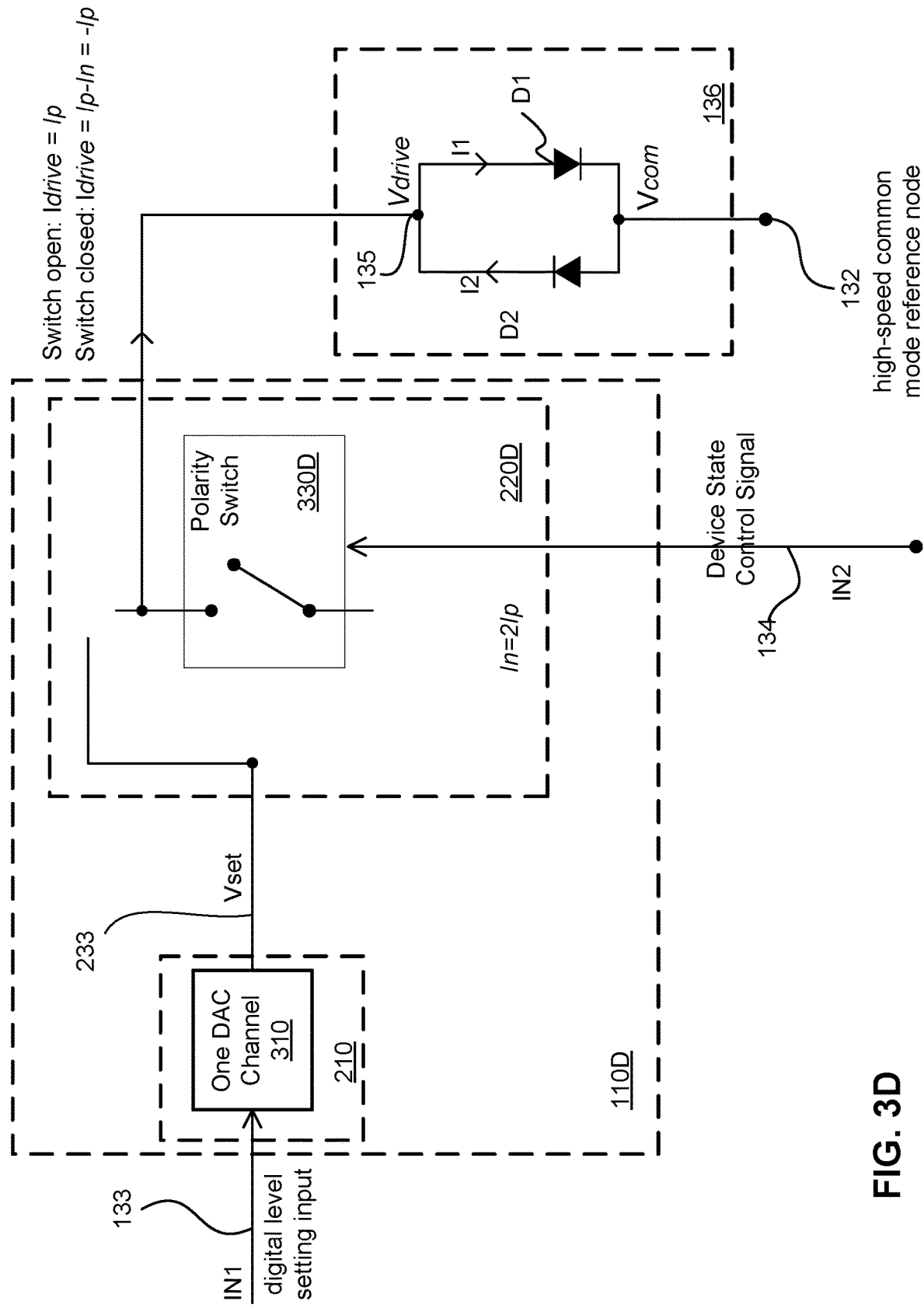
FIG. 3D illustrates, in a component view, an example implementation of a bi-polar drive circuit for controlling an MZI-based push-pull CIOS cell in electrical domain according to another embodiment of the present disclosure.
Figure 3E:
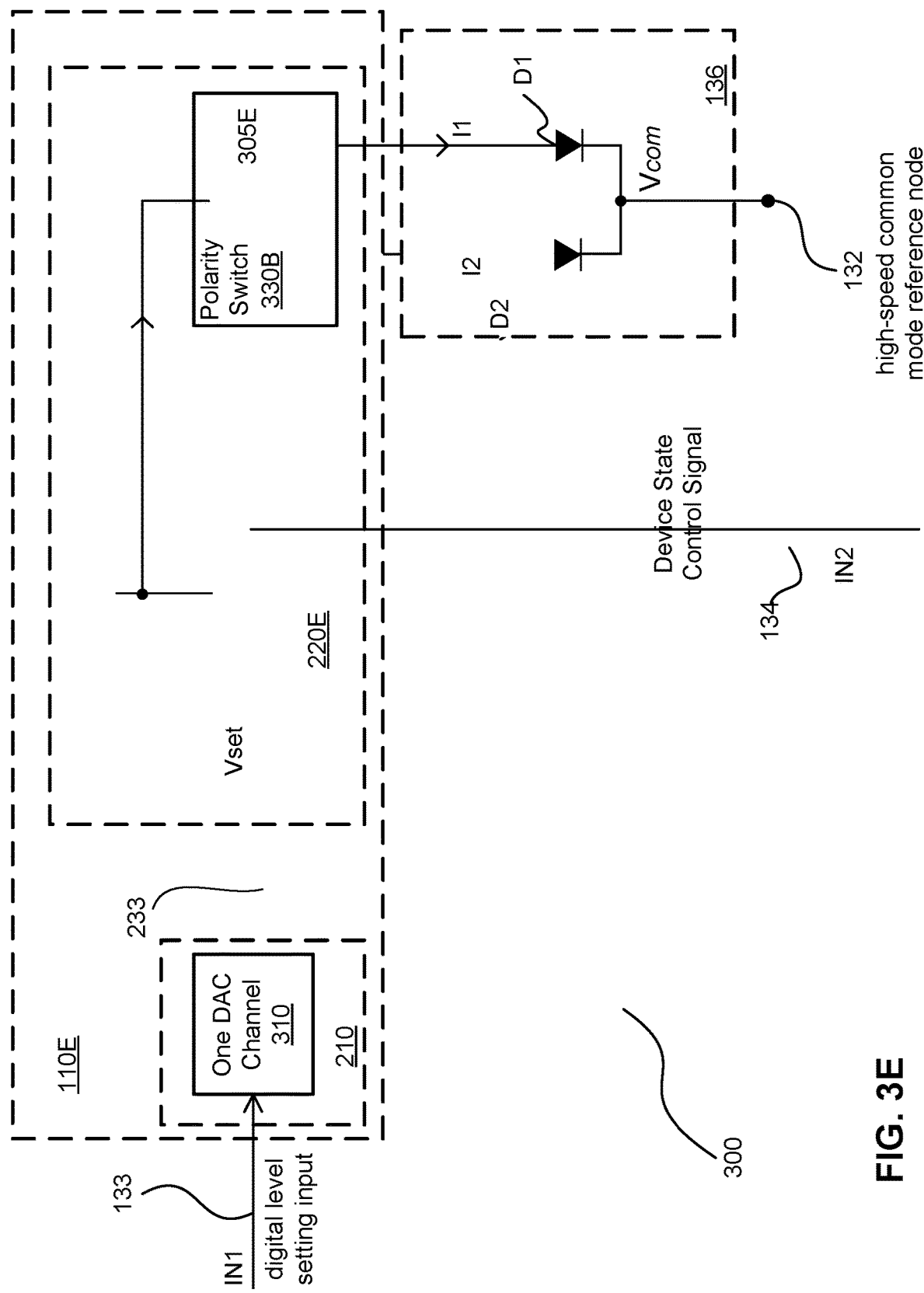
FIG. 3E illustrates, in a component view, an example of an alternative implementation of a unipolar drive circuit for controlling an MZI-based push-pull CIOS cell in electrical domain according to another embodiment of the present disclosure.
Figure 3F:
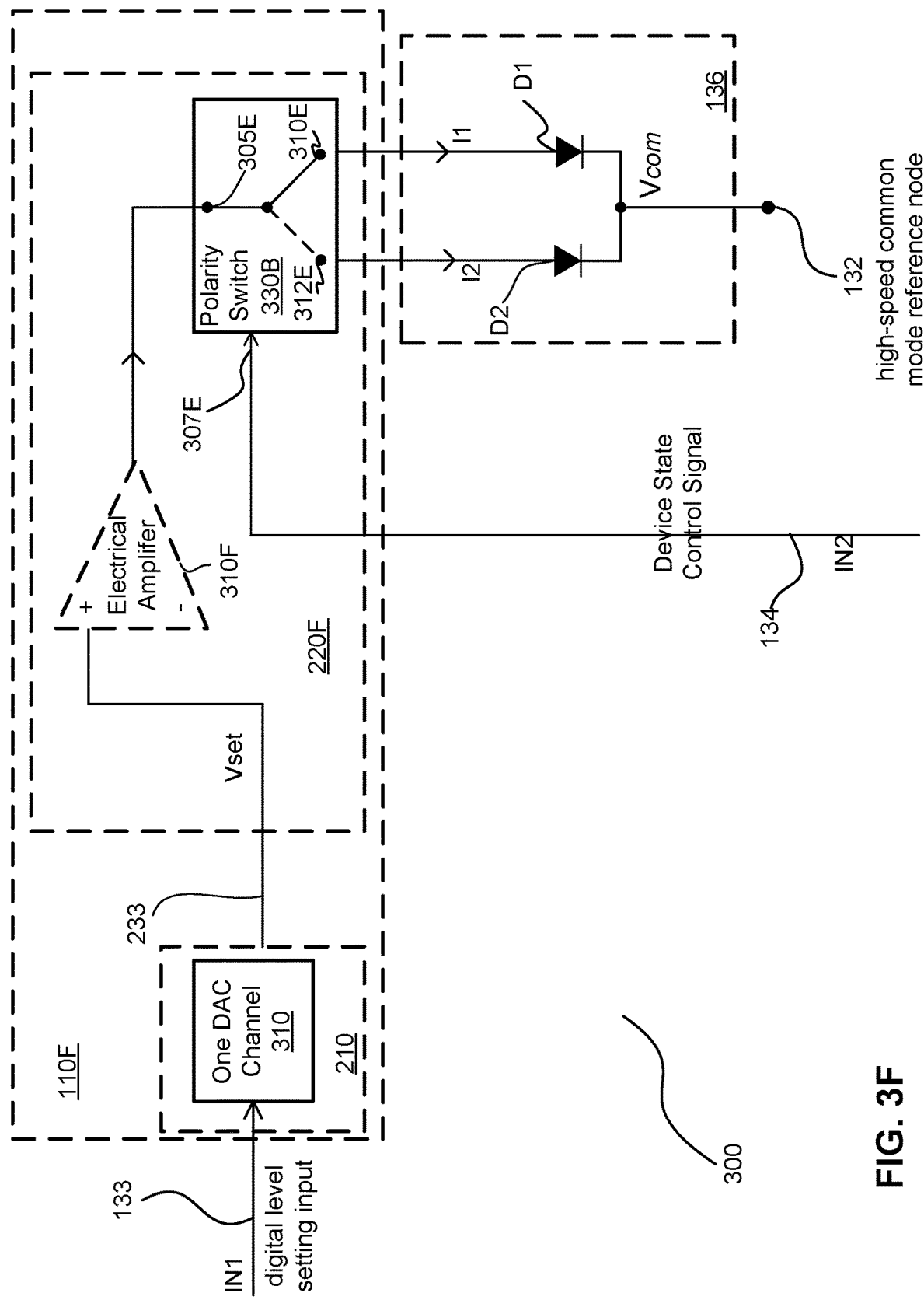
FIG. 3F illustrates, in a component view, an example of an alternative implementation of a unipolar drive circuit for controlling an MZI-based push-pull CIOS cell in electrical domain according to another embodiment of the present disclosure.

Alternatively, as shown in FIGS. 3E and 3F, the phase shifters can be electrically connected in parallel to two separate outputs of a single pole double throw switch, where the input to the switch is connected to a source of drive voltage or current, and operation of the switch is used to select which one of the two phase shifters is being driven. Note that in FIGS. 3E and 3F, the phase shifters are connected in parallel with common polarity, and are not connected in reverse parallel.

Although an MZI-based Carrier Injection Optical Switch (CIOS) cell is illustrated in FIG. 1A, it will be readily understood that other types of optical devices may be used, such as a Micro Ring Resonator (MRR), an MZI device comprising an MRR, a plurality of MRRs in series or parallel, an optical switch, an optical attenuator, a variable optical attenuator, a modulator, or a pilot tone modulator, provided that device requires a push-pull drive. In this case, the same circuitry can be used, and the phase shifters D1 and D2 may remain electrically coupled in reverse parallel as shown. However some or all of the optical components of the MZI device, such as the couplers 105 and 125, the bias element 129 and the optical waveguide arms 103 and 104, may be varied. The embodiments illustrated in FIGS. 2 and 3A to 3F do not explicitly show the device optical components, and the phase shifters D1 and D2 illustrated therein can be integrated with a CIOS switch cell as in FIG. 1, or to another optical device.

In addition, although a bi-polar drive circuit is illustrated in FIG. 1A to drive a pair of carrier injection phase shifters connected in parallel in opposite polarities with push-pull configuration, a unipolar drive circuit may alternatively be used to drive a pair of phase shifters connected in parallel with common polarity where the phase shifters are driven in a push-pull manner. A description of the unipolar drive circuit will be provided with respect to FIGS. 3E and 3F.

More generally, embodiments of the present disclosure provide for apparatus for controlling a pair of phase shifters of an optical device, such as but not limited to an MZI-based optical switch. The pair of phase shifters are operated in push-pull configuration. This may involve causing only one of the phase shifters to be forward biased at a time, in the case of asymmetrically conducting phase shifters. The apparatus includes a drive circuit having a first input terminal and a second input terminal, and operating circuitry. The circuitry is configured to generate a drive signal having a magnitude which is set based on a level setting input signal received at the first input terminal. The circuitry is further configured to drive one of the pair of phase shifters using the drive signal. The driven one of the pair of phase shifters is selected based on a device state control signal received at the second input terminal.

While the device has principally been illustrated by means of a 2×2 optical switch having 2 optical inputs and 2 optical outputs, it should be understood that the device may also be configured as a 1×2 switch having 1 input and 2 outputs, a 2×1 switch having 2 inputs and 1 output, or a 1×1 device having 1 input and 1 output. In cases where there is only 1 output port, light is coupled out of the output port or is scattered away from the device, with the fraction of light that is coupled out of the output port being controlled by the phase shifters. Any device configuration may be used as a switch, modulator or attenuator depending on the desired system application.

In various embodiments, the drive circuit includes an electrical switch. This switch may be used, for example, to selectably couple output of the drive circuit to one of the pair of phase shifters at a time. Alternatively, the switch may be used to switch polarity of the drive signal, by reversing the voltage polarity relative to a common reference voltage, or by reversing a direction of drive current.

In various embodiments, only one of the phase shifters is predominantly driven at a time. This may be achieved for example by forward-biasing one of the phase shifters with a predetermined voltage or causing a predetermined amount of current to flow through the phase shifter in accordance with such forward-biasing. The other phase shifter may then be reverse-biased. In this case, a nominal but typically limited amount of current may flow through the other, reverse-biased phase shifter, which can thus be considered to be driven in a limited manner. However, for purposes of clarity, it is considered herein that only the forward-biased phase shifter is being primarily driven.

In some embodiments, the circuitry generates the drive signal specifically for driving the pair of phase shifters. That is, the drive signal is used for driving either one of the pair of phase shifters, but the drive signal is not used for driving any other phase shifters that may be part of or other optical devices (e.g. which may be operatively coupled to or integrated with the optical device and/or disposed on the same optical chip or substrate). As such, each drive signal indicative of a magnitude is associated with a single device state control signal for setting the state of an optical device (e.g. an ON or OFF state, or one of a plurality of discrete states). Thus, the drive signal and the device state control signal are applied only to the same optical device. Because the drive signal is specific to one device, the drive signal magnitude can be tuned specifically based on characteristics of the two phase shifters of that device. The same tuning may be applicable to each of the two phase shifters, but at different times, due to the fact that both phase shifters have similar characteristics. These similar characteristics may be due to co-manufacture and co-location (i.e. close proximity) of the two phase shifters in the manufactured optical device. In some embodiments, the same drive signal is used to drive multiple (possibly more than two) phase shifters having similar characteristics due to co-manufacture and co-location.

FIG. 2 illustrates, in a block view, an example configuration of a bi-polar drive circuit for controlling an MZI-based push-pull CIOS cell in electrical domain according to at least one embodiment of the present disclosure. As illustrated in FIG. 2, the bi-polar drive circuit 110 may include a level control circuit 210 configured to receive the level setting input signal and to provide an analog level setting output signal 233. The bi-polar drive circuit 110 may also include a state control circuit 220 configured to control a polarity of the drive signal based on the device state control signal received at the second input terminal 134. The level control circuit 210 may be operated at a first speed to vary the analog level setting output signal, and the state control circuit 220 may be operated at a second speed, higher than the first speed, to vary the polarity of the drive signal. For example, this may allow the level control circuit 210 to employ more complex and hence slower circuitry such as a DAC, while the state control circuit 220 employs faster circuitry such as switches. Additionally, the state control circuit 220 may be further configured to convert a voltage to a current or a voltage and switch the polarity of the current or voltage based on the device state control signal.

Thus, as illustrated in FIG. 2 and described herein above, the bi-polar drive circuit 110 may be configured to control the magnitude of the drive signal based on the analog level setting output signal, and to cause a drive current to flow. The drive current is caused to flow in a first direction and with said magnitude, primarily through one of the carrier injection phase shifters when the device state control signal is in the first state. The drive current is caused to flow opposite to the first direction and with said magnitude, primarily through another one of the carrier injection phase shifters when the device state control signal is in the second state.

More generally, the drive circuit, which may or may not be a bi-polar drive circuit, may include two substantially separate but interconnected circuits, namely a level control circuit and a state control circuit. The level control circuit is configured to generate an analog output signal based on a (possibly digital) level setting input signal. Then, magnitude of the drive signal is based on the magnitude of the analog output signal. The level control circuit may include a DAC or a single channel of a multi-channel DAC. The state control circuit is configured to control, based on the device state control signal, which one of the pair of phase shifters is predominantly driven at a time using the drive signal of the set magnitude. The state control circuit may include at least one switch and be responsive to an input signal having discrete signal states causing the at least one switch to enter a corresponding switching state. In various embodiments, the level control circuit is operated at a first speed to vary the analog output signal, and the state control circuit is operated at a second speed, higher than the first speed, to vary which one of the pair of phase shifters is driven using the drive signal. This allows the state of the optical device to be altered at the speed of the state control circuit. At the same time, the level control circuit can be operated, on a slower time scale, to tune the control circuit so that the optimal (or substantially optimal) drive signal magnitude is applied to the optical device. This drive signal magnitude can be previously determined based on prior calibration operations. Once received, the same drive signal magnitude can be held constant until updated.

FIG. 3A illustrates, in a component view, an example implementation of a bi-polar drive circuit 110A for controlling an MZI-based push-pull CIOS cell in electrical domain according to an embodiment of the present disclosure. As illustrated in FIG. 3A, the bi-polar drive circuit 110A may include a level control circuit 210 comprising a Digital-to-Analog Converter (DAC) 310 configured to produce and hold an analog output signal as the analog level setting output signal 233. The analog output signal accordingly has a level that corresponds to a digital input signal provided to the DAC. The digital input signal is provided as the level setting input signal received at input terminal 133. In some embodiments, the DAC may be provided as one channel of a multi-channel DAC and is accordingly referred to as one DAC channel 310 in this instant application.

The one DAC channel 310 may include an input terminal electrically coupled to the first input terminal 133 of the bi-polar drive circuit 110A to receive the level setting input signal. The level setting input signal may be a digital signal being provided based on calibration information, for example as stored in a calibration look-up table. The calibration information may be determined according to a prior calibration procedure. The calibration information may indicate an optimal, desired or adequately optimal magnitude for the drive signal being output by the drive circuit. The one DAC channel 310 may further include an output terminal configured to provide an analog level setting output signal 233 having a level that corresponds to the level setting input signal, according to the digital-to-analog conversion operation of the DAC channel 310.

As illustrated in FIG. 3A, the bi-polar drive circuit 110A may further include a state control circuit 220A. The state control circuit 220A may include a polarity switch 330A (single pole double throw) having a first input terminal electrically coupled to the output terminal of the one DAC channel 310 to receive the analog level setting output signal 233. The state control circuit 220A may include a second input terminal electrically coupled to the output terminal of the one DAC channel 310 via a voltage inverter 320 to receive an inversing analog level setting output signal having substantially the same magnitude as that of the analog level setting output signal 233 but the opposite voltage polarity, relative to the voltage at the high speed common mode reference node 132. The state control circuit 220A may include a third input terminal electrically coupled to the second input terminal of the state control circuit 220A to receive the device state control signal via terminal 134. The circuit 220A may include an output terminal electrically coupled to the output terminal of the bi-polar drive circuit 110A via a non-inverting electrical amplifier 340 to drive the pair of carrier injection phase shifters D1 and D2 that are integrated with the MZI-based CIOS cell. Accordingly, a positive voltage signal (relative to the voltage at reference node 132) may be derived at the output terminal of the bi-polar drive circuit when the device state control signal is in the first state; and a negative voltage signal (relative to the voltage at reference node 132) may be derived at the output terminal of the bi-polar drive circuit when the device state control signal is in the second state. The voltage signal derived at the output terminal of the bi-polar drive circuit 110A may drive the pair of carrier injection phase shifters D1 and D2 into ON or OFF states, which in turn may cause the CIOS cell to operate in "Cross" or "Bar" states, respectively.

When the positive voltage signal is output by the bi-polar drive circuit, phase shifter D1 is forward biased and phase shifter D2 is reverse biased. This drives the phase shifter D1 in the ON state and places the phase shifter D2 in the OFF state. Likewise, when the negative voltage signal is output by the bi-polar drive circuit, phase shifter D2 is forward biased and phase shifter D1 is reverse biased. This drives the phase shifter D2 in the ON state and places the phase shifter D1 in the OFF state. When in the ON state, the phase shifter D1 or D2 imparts a phase shift which is configurable based on drive signal magnitude, which can be set to a desired level for example via calibration.

FIG. 3B illustrates, in a component view, an example implementation of a bi-polar drive circuit for controlling an MZI-based push-pull CIOS cell in electrical domain according to another embodiment of the present disclosure. As illustrated in FIG. 3B, the bi-polar drive circuit 110B may include a level control circuit 210 comprising one DAC channel 310 operating the same way as described herein above with respect to FIG. 3A. The bi-polar drive circuit 110B may further include a state control circuit 220B which may be analogous to the state control circuit 220A of FIG. 3A. The state control circuit 220B may include a polarity switch 330B (single pole double throw) comprising a first input terminal electrically coupled to the output terminal of the one DAC channel 310 to receive the analog level setting output signal 233; a second input terminal electrically coupled to the second input terminal of the state control circuit 220B to receive the device state control signal; a first output terminal electrically coupled to the output terminal of the bi-polar drive circuit 110B via a non-inverting electrical amplifier 340; and a second output terminal electrically coupled to the output terminal of the bi-polar drive circuit 110B via an inverting electrical amplifier 350 having substantially the same voltage gain magnitude as that of the non-inverting electrical amplifier 340. In some embodiments, the non-inverting electrical amplifier 340 and the inverting electrical amplifier 350 may be implemented using non-inverting and inverting unit-gain amplifiers, respectively. Alternatively, the two electrical amplifiers 340, 350 may have the same gain but not necessarily unity. Ground reference for the two amplifiers may be equal to the voltage at the reference node 132. Thus, a positive voltage signal (relative to voltage at reference node 132) may be derived at the output terminal of the bi-polar drive circuit 110B when the device state control signal is in the first state; and a negative voltage signal (relative to voltage at reference node 132), having the same magnitude as the positive voltage signal but opposite sign, may be derived at the output terminal of the bi-polar drive circuit 110B when the device state control signal is in the second state. The voltage signal derived at the output terminal of the bi-polar drive circuit 110B may cause the pair of carrier injection phase shifters D1 and D2 to be driven into appropriate ON or OFF states, which in turn may cause the CIOS cell to operate in "Cross" or "Bar" states, respectively. Such operation in terms of forward and reverse bias of the phase shifters D1 and D2 is as already described above.

FIG. 3C illustrates, in a component view, an example implementation of a bi-polar drive circuit for controlling an MZI-based push-pull CIOS cell in electrical domain according to another embodiment of the present disclosure. As illustrated in FIG. 3C, the bi-polar drive circuit 110C may include a level control circuit 210 comprising one DAC channel 310 operating the same way as described herein above with respect to FIG. 3A and FIG. 3B. The bi-polar drive circuit 110C may further include a state control circuit 220C which may be analogous to the state control circuits 220A and 220B of FIG. 3A and FIG. 3B, respectively. The state control circuit 220C may include a non-inverting electrical amplifier 340 comprising a non-inverting input terminal electrically coupled to the output terminal of the one DAC channel 310 and an output terminal. The circuit 220C may further include an inverting electrical amplifier 350 comprising an inverting input terminal electrically coupled to the output terminal of the one DAC channel 310 and an output terminal. The circuit 220C may further include a polarity switch 330A comprising a first input terminal electrically coupled to the output terminal of the non-inverting electrical amplifier 340; a second input terminal electrically coupled to the output terminal of the inverting electrical amplifier 350; a third input (control input) terminal electrically coupled to the second input terminal of the state control circuit 220C to receive the device state control signal; and an output terminal electrically coupled to the output terminal of the bi-polar drive circuit 110C. In some embodiments, the non-inverting unity gain amplifier 340 may be omitted, such one input terminal of the switch 330A is directly coupled to the output terminal of the one DAC channel 310. The output terminal of the bi-polar drive circuit is thus operated to drive the pair of carrier injection phase shifters D1 and D2, which are in turn coupled to the MZI-based CIOS cell. More specifically, a positive voltage signal is provided, via the non-inverting amplifier 340, at the output terminal of the bi-polar drive circuit 110C when the device state control signal is in the first state. A negative voltage signal is provided, via the inverting amplifier 350, at the output terminal of the bi-polar drive circuit 110C when the device state control signal is in the second state. The voltage signal derived at the output terminal of the bi-polar drive circuit 110C may drive the pair of carrier injection phase shifters D1 and D2 into corresponding ON or OFF states, due to forward and reverse biasing of same. This in turn may cause the CIOS cell to operate in "Cross" or "Bar" states, respectively.

FIG. 3D illustrates, in a component view, an example implementation of a bi-polar drive circuit for controlling an MZI-based push-pull CIOS cell in electrical domain according to another embodiment of the present disclosure. As illustrated in FIG. 3D, the bi-polar drive circuit 110D may include a level control circuit 210 comprising one DAC channel 310 operating the same way as described herein above with respect to FIG. 3A, FIG. 3B, and FIG. 3C. The bi-polar drive circuit 110D may further include a state control circuit 220D which may be analogous to the state control circuits 220A, 220B, 220C of FIG. 3A, FIG. 3B and FIG. 3C, respectively. The state control circuit 220D may include a first voltage controlled current source Ip electrically coupled to the output terminal of the one DAC channel 310 to receive the analog level setting output signal as a current source control voltage. The state control circuit 220D may include a second voltage controlled current source In having a current magnitude that is double of that of the first voltage controlled current source Ip. The second voltage controlled current source In is electrically coupled to the one DAC channel to receive the analog level setting signal as the current source control voltage. The state control circuit 220D may further include an input (control) terminal electrically coupled to the second input terminal of the state control circuit 220D to receive the device state control signal. An output terminal is electrically coupled to the first voltage controlled current source Ip; and a polarity switch 330D (single pole single throw) that connects the second voltage controlled current source In to the first voltage controlled current source Ip when the device state control signal is in the second state (and the switch 330D is closed), and disconnects the second voltage controlled current source In from the first voltage controlled current source Ip when the device state control signal is in the first state (and the switch 330D is open). When the first and the second voltage controlled current sources are disconnected, the current from the first voltage controlled current source (i.e. Idrive=Ip) flows through the first carrier injection phase shifter D1 towards the high speed common mode reference node 132. The first carrier injection phase shifter D1 is turned on and imparts a phase shift corresponding to the provided amount of current, and the second carrier injection phase shifter D2 is substantially turned off. The CIOS cell 120 is thereby placed in "Cross" state (when the amount of phase shift and current are tuned appropriately). When the first and the second voltage controlled current sources are connected due to closing of the switch 330D, a drive current of Idrive=In-Ip flows from the high speed common mode reference node 132 through the second carrier injection phase shifter D2 towards the common node 135. The first carrier injection phase shifter D1 is substantially turned off and the second carrier injection phase shifter D2 is turned on and imparts a phase shift corresponding to the provided amount of current. The CIOS cell 120 is in "Bar" state (when the amount of phase shift and current are tuned appropriately).

Although various implementation examples of using one bi-polar drive circuit to drive a pair of carrier injection phase shifters connected in parallel in opposite polarities with push-pull configuration have been discussed herein above, a unipolar drive circuit may be derived from the bi-polar drive circuit after a minor modification to drive a pair of carrier injection phase shifters connected in parallel in a uni-polar push-pull configuration. FIG. 3E illustrates, in a component view, an example of an alternative implementation of a unipolar drive circuit for controlling an MZI-based push-pull CIOS cell in electrical domain according to another embodiment of the present disclosure.

As illustrated in FIG. 3E, the uni-polar drive circuit 110E may include a level control circuit 210 comprising one DAC channel 310 operating the same way as described herein above with respect to FIGS. 3A-3D. The uni-polar drive circuit 110E may further include a state control circuit 220E. The state control circuit 220E may include a polarity switch 330B comprising a first input terminal 305E electrically coupled to the output terminal of the one DAC channel 310 via a voltage controlled current source 302E; a second input (control) terminal 307E electrically coupled to the second input terminal of the state control circuit 220E to receive the device state control signal; and a first and a second output terminals 310E, 312E electrically coupled to a pair of carrier injection phase shifters D1 and D2, respectively. The current from the voltage controlled current source flows through the first carrier injection phase shifter D1 when the device state control signal is in the first state; and the current from the voltage controlled current source flows through the second carrier injection phase shifter D2 when the device state control signal is in the second state. The current flow may drive the pair of carrier injection phase shifters D1 and D2 into ON or OFF states, which in turn may cause the CIOS cell to operate in "Cross" or "Bar" states, respectively. This drive circuit therefore illustrates an example of a switching circuit configured to operatively couple the drive signal to a selectable one of the pair of phase shifters based on the device state control signal. However, it should be appreciated that the illustrated bi-polar drive circuits also utilize such a switching circuit, which is configured to operatively coupled the drive signal to a selectable one of the pair of phase shifters based on the device state control circuit. In the case of the bi-polar drive circuit, the selectable operative coupling is achieved by operating the switch so that current direction or voltage polarity is switchably changed.

FIG. 3F illustrates the same circuitry as FIG. 3E, except that the current source 302E has been omitted and an optional electrical amplifier 310F has been added in its place. The amplifier can be omitted if additional gain is not necessary and the output of the DAC 310 is sufficiently strong to drive the phase shifters. Operation of the circuit of FIG. 3F is the same as in FIG. 3E, except that the current source is omitted. A voltage is switchably applied to the phase shifters D1 and D2.

In various embodiments, the state control circuit 220 may include but not limited to a switch that is implemented in the form of a multiplexer or demultiplexer. As described elsewhere herein, this switch is either used to implement polarity switching for the drive current or drive voltage output by the drive circuit, or for switchably coupling the drive circuit to a selected one of a plurality of phase shifters. For example, the polarity switch 330A of FIG. 3A or 3C may be a 2:1 multiplexer. The polarity switch 330B of FIG. 3B, 3E or 3F may be a 1:2 demultiplexer. Alternatively, the switches may be multiplexers or demultiplexers with different numbers of inputs and outputs. In some embodiments, the same drive signal is used to selectably drive three or more co-manufactured and co-located phase shifters of an optical device. In this case, an N-way switch, such as an N:1 multiplexer or 1:N demultiplexer, can be used to controllably route the drive signal so that a selected one of the plurality of three or more phase shifters is operated. An N-state switching cell control signal can be provided to the N-way switch.

Figure 4:
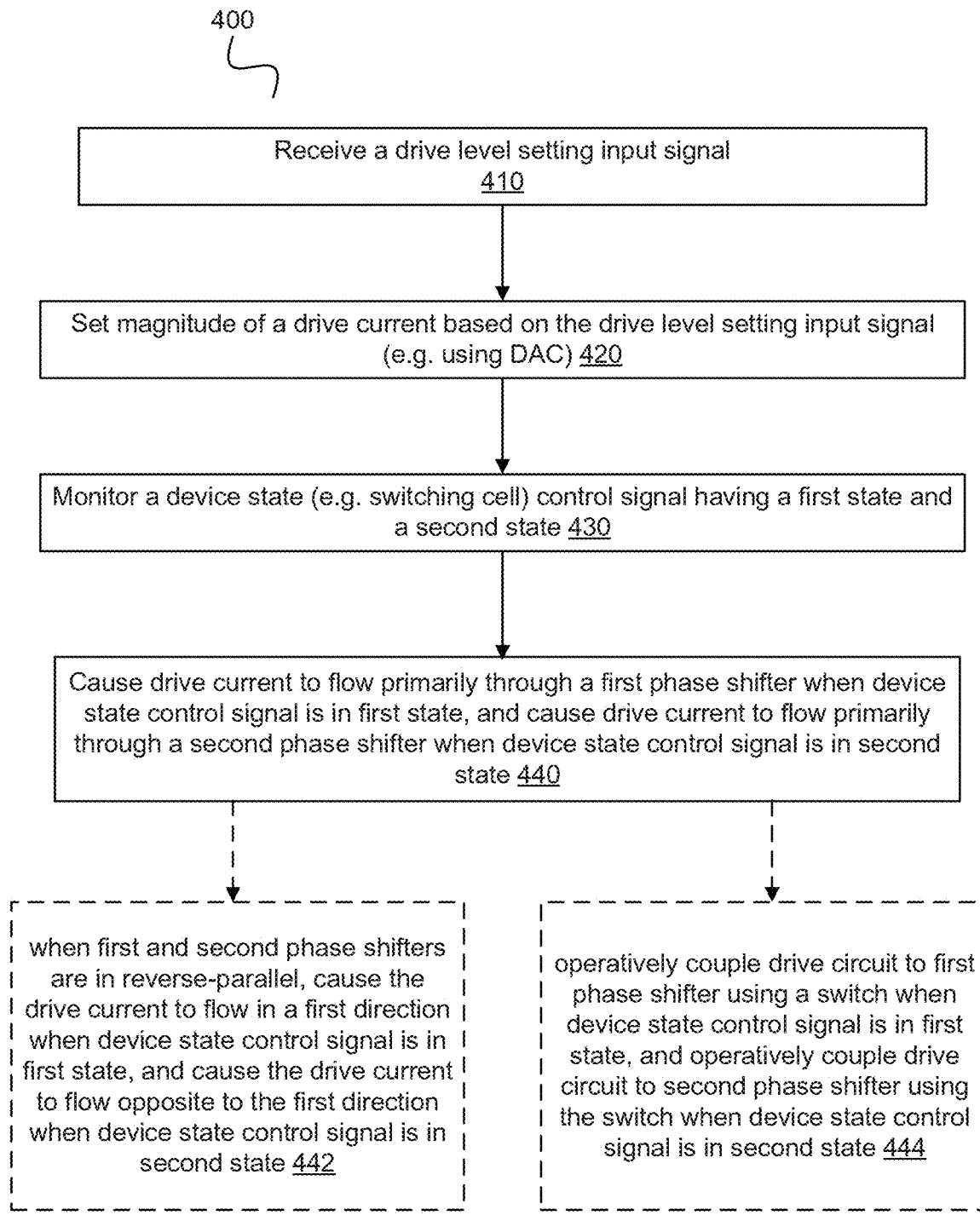
FIG. 4 illustrates, in a flow chat, a method for controlling an MZI-based push-pull CIOS cell according to an embodiment of the present disclosure.

FIG. 4 illustrates, in a flow chart, a method 400 for controlling an optical device having multiple phase shifters, according to at least one embodiment of the present disclosure. The phase shifters may be operated in a push-pull configuration, and the device may for example be an MZI-based push-pull CIOS cell. A pair of phase shifters of the optical device are controlled. The method 400 may include receiving 410, by a drive circuit, a level setting input signal and setting 420 a magnitude of a drive current based on the level setting input signal. The setting a magnitude 420 of a drive current may include, by a level control portion of the drive circuit, receiving the level setting input signal and providing an analog level setting output signal based on the level setting input signal. The magnitude of the drive current may be set based on the analog level setting output signal. The drive circuit may be a bi-polar drive circuit or a unipolar drive circuit. The drive current magnitude may be set specifically for the pair of phase shifters. The level setting input signal may be associated with a single device state control signal such as mentioned below. This results in the level setting input signal being specific to a single optical device, or at least specific to a set of co-manufactured and proximate (co-located) phase shifters.

The method 400 may further include monitoring 430, for example by a state control portion of the bi-polar drive circuit, a device state control signal (e.g. a switching cell control signal) having a first state and a second state. The method 400 may further include causing 440 the drive current to flow through (e.g. substantially only) a first one of the pair of phase shifters when the device state control signal is in the first state and to flow through (e.g. substantially only) a second one of the pair of phase shifters when the device state control signal is in the second state.

In some embodiments, the pair of phase shifters are connected together in reverse-parallel to an output of the drive circuit. In this case, the causing 440 can include controlling a polarity of the drive current based on the device state control signal. The causing 440 can thereby include causing 442 the drive current to flow through a phase shifter circuit in a first direction when the device state control signal is in the first state and to flow through the phase shifter circuit in opposition to the first direction when the device state control signal is in the second state. The phase shifter circuit may include a pair of carrier injection phase shifters (or other asymmetrically conducting phase shifters) coupled respectively to each of a pair of waveguide arms of the optical device. The pair of carrier injection phase shifters may be connected in parallel in opposite polarities and electrically coupled to an output terminal of the bi-polar drive circuit. In some embodiments, the causing 440 may include generating the drive current using at least one current source of the bi-polar drive circuit. In other embodiments, the causing 440 may include generating a drive voltage at an output of the bi-polar drive circuit coupled to both of the pair of phased shifters, and the drive current may flow in response to the drive voltage.

The method 400 may further include operating the level control portion of the bi-polar drive circuit at a first speed to provide the analog level setting output signal; and operating the state control portion of the bi-polar drive circuit at a second speed, higher than the first speed, to control the polarity of the drive current.

When the drive circuit is a unipolar drive circuit, the causing 440 can include another operation 444 which includes operatively coupling the drive circuit to a first one of the pair of phase shifters using a switch to cause the drive current to flow through that first one of the pair of phase shifters. Similarly, with respect to the operation 444, causing the drive current to flow through the second one of the pair of phase shifters can include operatively coupling the drive circuit to the second one of the pair of phase shifters using the same switch. The switch may therefore connect the source of drive current (or a corresponding source of drive voltage) to a selected one of the pair of phase shifters at a time.

Although method 400 for controlling an optical device, such as an MZI-based push-pull CIOS cell, is discussed herein above, it will be readily understood that other types of optical devices may be controlled using the method 400, such as a Micro Ring Resonator (MRR), an MZI device comprising an MRR, a plurality of MRRs in series or parallel, an optical switch, an optical attenuator, a variable optical attenuator, a modulator, or a pilot tone modulator, provided that device requires a push-pull drive.

The method 400 may be applied separately for each of a plurality of optical devices. In this manner, level setting and device state control for each optical device can be performed separately. More specifically, separate level setting control signals are provided for each optical device. To achieve this, each separate level setting control signal can be associated with a separate device state control signal.

Figure 5:
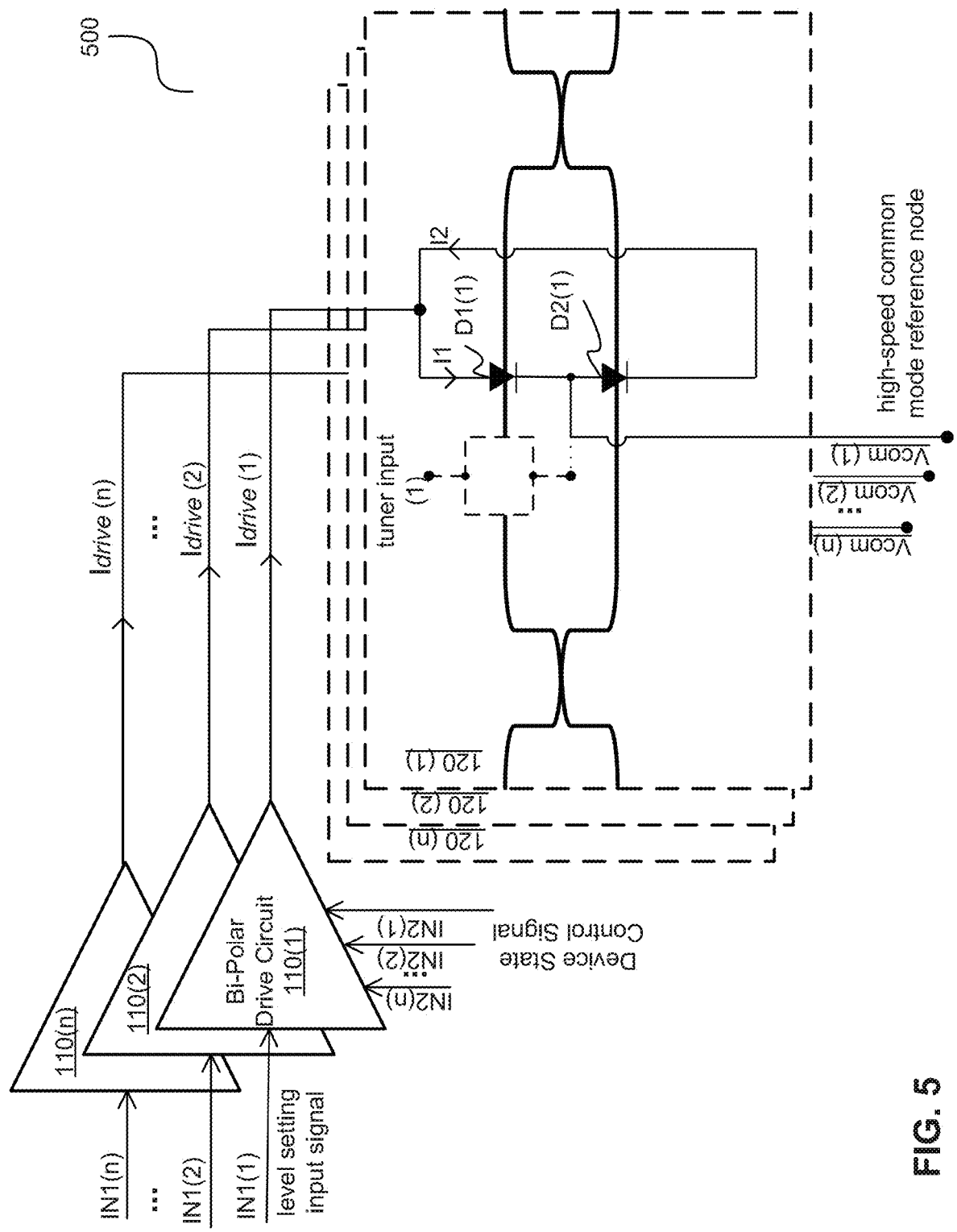
FIG. 5 illustrates, in a component view, an example configuration for driving a plurality of MZI-based push-pull CIOS cells in electrical domain according to an embodiment of the present disclosure.

FIG. 5 illustrates, in a component view, an example apparatus 500 for driving a plurality of MZI-based push-pull CIOS cells in electrical domain according to an embodiment of the present disclosure. The apparatus 500 comprises a plurality of the bi-polar drive circuits and a plurality of the MZI-based push-pull CIOS cells as described herein above. Each one of the bi-polar drive circuits is electrically coupled to a single MZI-based push-pull CIOS cell from the plurality of the MZI-based push-pull CIOS cells. Further, each one of the bi-polar drive circuits may include one DAC channel to drive a pair of carrier injection phase shifters as discussed herein above, and thus the number of the plurality of the bi-polar drive circuits is half of the number of the carrier injection phase shifters. The plurality of the high-speed common mode reference node from each of the plurality of the MZI based optical switching cell may be electrically coupled to a single DC bias or different DC biases.

The example embodiment as illustrated in FIG. 5 allows using only one DAC channel per each bi-polarity switch cell and provides drive current that can be independently adjusted to each bi-polarity CIOS cell. This solution provides the CIOS cells very fast switching of current (or voltage) direction and reduces the number of DAC required in the driving circuit.

Figure 6B:
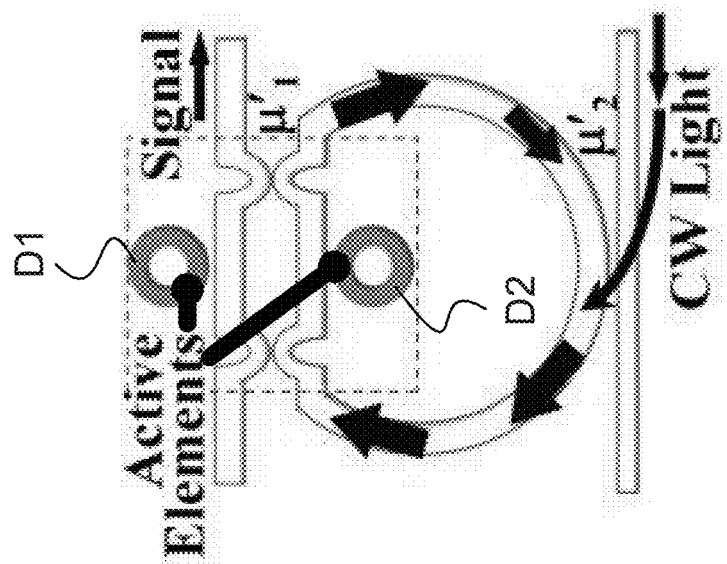
FIGS. 6A and 6B illustrate a Micro-ring Resonator device comprising a pair of phase shifters, which can be driven according to embodiments of the present disclosure.
Figure 6A:
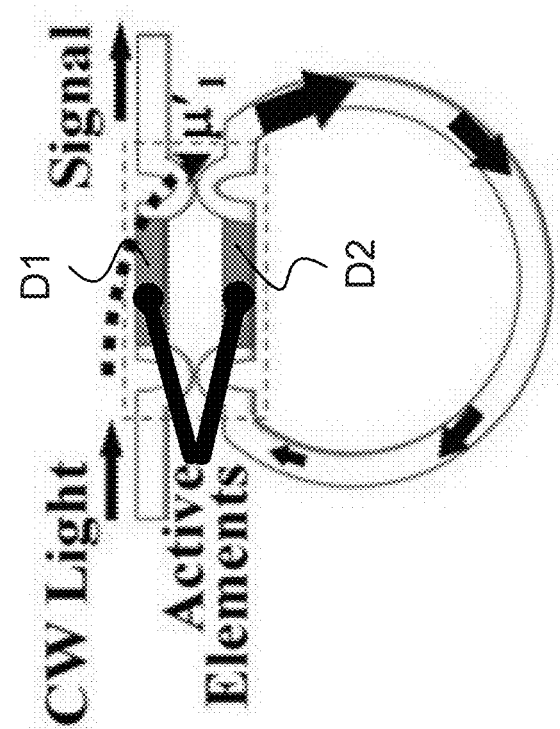

FIGS. 6A and 6B illustrate a Micro-ring Resonator device (MRR) 620 comprising a pair of phase shifters D1, D2, which can be electrically connected and driven according to embodiments of the present disclosure, for example using the drive circuit 110 of FIG. 1, or its variants as illustrated in FIGS. 2, 3A to 3F, or using the method as illustrated in FIG. 4. Details of the MRR can be found for example in "Silicon Micro-ring Resonator Device Design for Optical Interconnect Systems "Li, Yunchu. PhD Thesis. University of Southern California, ProQuest Dissertations Publishing, 2013. The phase shifters D1, D2 of the MRR 620 may be driven in push-pull mode, and may correspond to (forward-biased PIN junction) carrier injection phase shifters, for example. The MRR 620 comprises at least a pair of waveguides coupled together using a pair of optical couplers, wherein one of the waveguides is configured as a loop or ring. In FIG. 6A, the MRR 620 comprises a variable (controlled) optical coupler, the optical coupler being implemented as a Mach-Zehnder device. In FIG. 6B, the MRR 620 comprises a variable (controlled) optical coupler, the optical coupler being implemented as a ring-assisted Mach-Zehnder device. A pair of ring devices, which include the phase shifters D1, D2 as a portion thereof (precise location not shown), control the behavior of the overall larger MRR device 620. Embodiments of the present disclosure may comprise one or a plurality of MRR devices 620.

Additionally, in various embodiments discussed herein above, multiple ground pads may be provided in order to mitigate electrical crosstalk. For example, ground pads electrically coupled to different phase shifters can be separated.

Control electronics for providing the level setting input signals and device state control signals, and for managing calibration operations, can include computer processors operatively coupled to memory, microcontrollers or other electronic circuitry as would be readily understood by a worker skilled in the art. Optical components providing optical signals to and receiving optical signals from the optical devices described herein will also be readily understood by a worker skilled in the art, and may include optical communication devices, optical emission devices and optical sensing devices.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. An apparatus for controlling a pair of phase shifters of an optical device, the apparatus comprising a drive circuit including:
    a first input terminal and a second input terminal; and
    circuitry configured to:
        generate a drive signal, a magnitude of the drive signal set based on a level setting input signal received at the first input terminal, wherein the circuitry generates the drive signal for driving the pair of phase shifters; and
        drive a first phase shifter of the pair of phase shifters using the drive signal, the first phase shifter of the pair of phase shifters being selected based on a device state control signal received at the second input terminal, the magnitude of the drive signal remaining unchanged when the device state control signal is changed to select a second phase shifter of the pair of phase shifters.

2. The apparatus of claim 1, wherein the drive circuit comprises a Digital-to-Analog Converter (DAC) configured to control the magnitude of the drive signal based on a digital input.

3. The apparatus of claim 1, wherein the drive circuit comprises:
    a level control circuit configured to generate an analog output signal based on the level setting input signal, wherein the magnitude of the drive signal is based on the magnitude of the analog output signal; and
    a state control circuit configured to control which one of the pair of phase shifters is predominantly driven at a time using the drive signal based on the device state control signal.

4. The apparatus of claim 3, wherein the level control circuit is operated at a first speed to vary the analog output signal, and wherein the state control circuit is operated at a second speed, higher than the first speed, to vary which one of the pair of phase shifters is driven using the drive signal.

5. The apparatus of claim 1, wherein the drive circuit is a bi-polar drive circuit configured to control a polarity of the drive signal based on the device state control signal and provide the drive signal via an output terminal of the bi-polar drive circuit, and wherein the pair of phase shifters are asymmetrically conducting, the apparatus further comprising a phase shifter circuit comprising the pair of phase shifters connected together in reverse-parallel and driven by the drive signal via the output terminal of the bi-polar drive circuit.

6. The apparatus of claim 5, wherein the bi-polar drive circuit comprises:
    a level control circuit configured to receive the level setting input signal and to provide an analog output signal, wherein the magnitude of the drive signal is based on the magnitude of the analog output signal; and
    a state control circuit operatively coupled to the level control circuit and configured to control polarity of the drive signal based on the device state control signal.

7. The apparatus of claim 6, wherein the state control circuit comprises:
    a polarity switch comprising:
        a first switch input terminal electrically coupled to the level control circuit and receiving the analog output signal therefrom;
        a second switch input terminal electrically coupled to the level control circuit via a voltage inverting circuit and receiving a signal equal in magnitude and opposite in polarity to the analog output signal;
        a switch control input terminal configured to receive the device state control signal; and
        a switch output terminal operatively coupled to the output terminal of the bi-polar drive circuit, wherein
        the polarity switch is configured to operatively couple the first switch input terminal to the output terminal of the level control circuit when the device state control signal is in a first state, and
        the polarity switch is configured to operatively couple the second switch input terminal to the output terminal of the level control circuit via the voltage inverting circuit when the device state control signal is in a second state.

8. The apparatus of claim 6, wherein the state control circuit comprises:
    a polarity switch comprising:
        a first switch input terminal electrically coupled to the level control circuit and receiving the analog output signal therefrom;
        a switch control input terminal configured to receive the device state control signal;
        a first switch output terminal operatively coupled to the output terminal of the bi-polar drive circuit via a non-inverting electrical amplifier to drive the optical device; and
        a second switch output terminal operatively coupled to the output terminal of the bi-polar drive circuit via an inverting electrical amplifier to drive the optical device, wherein the polarity switch is configured to drive the non-inverting electrical amplifier with the analog output signal and to cause the inverting electrical amplifier to be undriven when the device state control signal is in a first state; and the polarity switch is configured to drive the inverting electrical amplifier with the analog output signal and to cause the non-inverting electrical amplifier to be undriven when the device state control signal is in a second state.

9. The apparatus of claim 6, wherein the state control circuit comprises:

a non-inverting electrical amplifier comprising a non-inverting input terminal electrically coupled to the level control circuit and receiving the analog output signal therefrom;

an inverting electrical amplifier comprising an inverting input terminal electrically coupled to the level control circuit and receiving the analog output signal therefrom; and a polarity switch comprising:

a first switch input terminal electrically coupled to an output terminal of the non-inverting electrical amplifier;

a second switch input terminal electrically coupled to an output terminal of the inverting electrical amplifier;

a switch control input terminal configured to receive the device state control signal; and a switch output terminal electrically coupled to the output terminal of the bi-polar drive circuit to drive the optical device, wherein the polarity switch is configured to route output of the non-inverting electrical amplifier to the output terminal of the bi-polar drive circuit when the device state control signal is in a first state, and the polarity switch is configured to route output of the inverting electrical amplifier to the output terminal of the bi-polar drive circuit when the device state control signal is in a second state.

10. The apparatus of claim 6, wherein the state control circuit comprises:

a first voltage controlled current source electrically coupled to the level control circuit and configured to set a first current level thereof based on the analog output signal, wherein output of the first voltage controlled current source is coupled to the output of the bi-polar drive circuit;

a second voltage controlled current source electrically coupled to the level control circuit and configured to set a second current level thereof based on the analog output signal, wherein the second current level is set at twice the first current level; and a switch comprising a switch control input terminal configured to receive the device state control signal, a first switch terminal operatively coupled to the output terminal of the bi-polar drive circuit and to the first voltage controlled current source, and a second switch terminal operatively coupled to the second voltage controlled current source, wherein the switch is switchable between an open position and a closed position based on the device state control signal, and wherein: when the switch is in the open position, the second voltage controlled current source is disconnected from the output terminal of the bi-polar drive circuit; and when the switch is in the closed position, the second voltage controlled current source is connected to the output terminal of the bi-polar drive circuit.

11. An optical device comprising an apparatus for controlling a pair of phase shifters of the optical device, the apparatus comprising a drive circuit including:

a first input terminal and a second input terminal; and circuitry configured to:

generate a drive signal, a magnitude of the drive signal set based on a level setting input signal received at the first input terminal, wherein the circuitry generates the drive signal specifically for driving the pair of phase shifters; and drive a first phase shifter of the pair of phase shifters using the drive signal, the first phase shifter of the pair of phase shifters being selected based on a device state control signal received at the second input terminal, the magnitude of the drive signal remaining unchanged when the device state control signal is changed to select a second phase shifter of the pair of phase shifters.

12. A method for controlling a pair of phase shifters of an optical device, the method comprising, by a drive circuit:

receiving a level setting input signal specific to the pair of phase shifters;

setting a magnitude of a drive current based on the level setting input signal, the magnitude of the drive current being set specifically for the pair of phase shifters;

monitoring a device state control signal having a first state and a second state, the magnitude of the drive current remaining unchanged when the device state control signal changes between the first state and the second state; and causing the drive current to flow through only a first phase shifter of the pair of phase shifters when the device state control signal is in the first state and to flow through only a second phase shifter of the pair of phase shifters when the device state control signal is in the second state.

13. The method of claim 12, wherein the optical device further comprises a second pair of phase shifters, the method further comprising, by a second drive circuit:

receiving a second level setting input signal specific to the second pair of phase shifters;

setting magnitude of a second drive current based on the second level setting input signal, the magnitude of the second drive current being set specifically for the second pair of phase shifters;

monitoring a second device state control signal having the first state and the second state; and causing the second drive current to flow through only a first one of the second pair of phase shifters when the second device state control signal is in the first state and to flow through only a second one of the second pair of phase shifters when the second device state control signal is in the second state.

14. The method of claim 12, wherein the pair of phase shifters are connected together in reverse-parallel to an output of the drive circuit, and wherein causing the drive current to flow through only the first phase shifter of the pair of phase shifters comprises causing the drive current to flow in a first direction, and wherein causing the drive current to flow through only the second phase shifter of the pair of phase shifters comprises causing the drive current to flow in opposition to the first direction.

15. The method of claim 14, wherein the drive current is directed through the first phase shifter of the pair of phase shifters when the drive current flows in the first direction and the drive current is directed through the second phase shifter of the pair of phase shifters when the drive current flows opposite to the first direction.

16. The method of claim 14, wherein the causing the drive current to flow comprises:
generating a drive voltage at the output of the drive circuit coupled to both of the pair of phase shifters, the drive current flowing in response to the drive voltage.

17. The method of claim 12, wherein the causing the drive current to flow through only the first phase shifter of the pair of phase shifters comprises:
operatively coupling the drive circuit to the first phase shifter of the pair of phase shifters using a switch, and wherein causing the drive current to flow through only the second phase shifter of the pair of phase shifters comprises operatively coupling the drive circuit to the second phase shifter of the pair of phase shifters using the switch.

18. The method of claim 12, wherein the receiving the level setting input signal and the setting the magnitude of the drive current are performed by a level control portion of the drive circuit, and wherein monitoring the device state control signal and causing the drive current to flow are performed by a state control portion of the drive circuit.

19. The method of claim 12, further comprising:
operating a level control circuit at a first speed to vary magnitude of the drive current; and
operating a state control circuit at a second speed, higher than the first speed, to vary which of the pair of phase shifters receives the drive current.

20. The apparatus of claim 1, wherein the device state control signal for selecting the first phase shifter of the pair of phase shifters indicates one of a plurality of discrete states of the optical device including an on state of the optical device and an off state of the optical device, and wherein the pair of phase shifters allow current flows in a same direction.

* * * * *